United States Patent
Wang et al.

(10) Patent No.: US 12,470,340 B2
(45) Date of Patent: Nov. 11, 2025

(54) USER EQUIPMENT AND METHOD FOR HANDLING PHYSICAL DOWNLINK SHARED CHANNEL RECEPTION

(71) Applicant: SHARP KABUSHIKI KAISHA, Sakai (JP)

(72) Inventors: Hai-Han Wang, Taipei (TW);
Chia-Hung Wei, Taipei (TW);
Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 563 days.

(21) Appl. No.: 17/882,142

(22) Filed: Aug. 5, 2022

(65) Prior Publication Data

US 2023/0049535 A1 Feb. 16, 2023

Related U.S. Application Data

(60) Provisional application No. 63/260,041, filed on Aug. 6, 2021, provisional application No. 63/260,043, filed on Aug. 6, 2021.

(51) Int. Cl.
*H04L 5/00* (2006.01)
*H04W 72/23* (2023.01)

(52) U.S. Cl.
CPC ........... *H04L 5/0048* (2013.01); *H04W 72/23* (2023.01)

(58) Field of Classification Search
CPC .. H04W 72/23; H04W 72/232; H04L 5/0094; H04L 5/001; H04L 5/0048; H04L 5/0044; H04L 5/0053
See application file for complete search history.

(56) References Cited

U.S. PATENT DOCUMENTS

2014/0314007 A1 10/2014 Chen et al.
2018/0212800 A1 7/2018 Park et al.
(Continued)

FOREIGN PATENT DOCUMENTS

| CN | 105144621 A | 12/2015 |
| CN | 112514437 A | 3/2021 |

OTHER PUBLICATIONS

3GPP TS 38.321, "3rd Generation Partnership Project; Technical Specification Group Radio Access Network; NR; Medium Access Control (MAC) protocol specification (Release 16)", V16.5.0 (Jun. 2021).
3GPP TS 38.213, "3rd Generation Partnership Project; Technical Specification Group Radio Access Network; NR; Physical layer procedures for control (Release 16)", V16.6.0 (Jun. 2021).
3GPP TS 38.331, "3rd Generation Partnership Project; Technical Specification Group Radio Access Network; NR; Radio Resource Control (RRC) protocol specification (Release 16)", V16.5.0 (Jun. 2021).
(Continued)

*Primary Examiner* — Andrew Lee
(74) *Attorney, Agent, or Firm* — ScienBiziP, P.C.

(57) ABSTRACT

A method by a UE for handling PDSCH reception includes receiving, from a BS, a first PDSCH configuration in a CFR configuration for a multicast PDSCH, a second PDSCH configuration in a BWP configuration for a unicast PDSCH, and first DCI scheduling the multicast PDSCH, the first PDSCH configuration including a first aperiodic resource set configuration, the second PDSCH configuration including a resource configuration and a second aperiodic resource set configuration, the resource configuration for configuring one or more ZP CSI-RS resources, and the first DCI including a first field for triggering a first aperiodic ZP CSI-RS; and determining, based on the first field, a first ZP CSI-RS resource set, which is not available for reception of the multicast PDSCH, from a first list of ZP CSI-RS resource sets configured by the first aperiodic resource set configuration. The resource configuration is absent in the first PDSCH configuration.

18 Claims, 5 Drawing Sheets

(56) References Cited

U.S. PATENT DOCUMENTS

| | | | | |
|---|---|---|---|---|
| 2019/0149365 A1* | 5/2019 | Chatterjee | ............. | H04W 76/11 |
| | | | | 370/329 |
| 2020/0052813 A1* | 2/2020 | Hosseini | ............... | H04L 1/0067 |
| 2020/0382354 A1* | 12/2020 | Sengupta | ................ | H04L 5/001 |
| 2021/0360592 A1 | 11/2021 | Wei et al. | | |
| 2021/0376967 A1* | 12/2021 | Ahn | ...................... | H04W 72/21 |
| 2022/0070901 A1* | 3/2022 | Muruganathan | ...... | H04L 5/0051 |
| 2022/0167367 A1* | 5/2022 | Tidestav | ............... | H04L 5/0048 |
| 2022/0329364 A1* | 10/2022 | Lee | ........................ | H04W 72/23 |
| 2022/0360360 A1* | 11/2022 | Awadin | ................... | H04W 8/24 |
| 2023/0039425 A1* | 2/2023 | Liu | ........................ | H04W 72/02 |
| 2023/0084429 A1* | 3/2023 | Zhang | ................... | H04W 72/23 |
| | | | | 370/330 |
| 2023/0413288 A1* | 12/2023 | Liu | ........................ | H04L 5/0053 |

OTHER PUBLICATIONS

3GPP TS 38.214, "3rd Generation Partnership Project; Technical Specification Group Radio Access Network; NR; Physical layer procedures for data (Release 16)", V16.6.0 (Jun. 2021).

3GPP TS 38.212, "3rd Generation Partnership Project; Technical Specification Group Radio Access Network, NR; Multiplexing and channel coding (Release 16)", V16.6.0 (Jun. 2021).

Qualcomm Incorporated, "Views on UE feedback for Multicast RRC_CONNECTED UEs", R1-2103187, 3GPP TSG RAN WG1 #104bis e-Meeting, Apr. 12-20, 2021.

\* cited by examiner

100

102 — Receive, from a BS, a first PDSCH configuration in a CFR configuration for multicast PDSCH, the first PDSCH configuration including a first aperiodic resource set configuration 104 — Receive, from the BS, a second PDSCH configuration in a BWP configuration for unicast PDSCH, the second PDSCH configuration including a resource configuration and a second aperiodic resource set configuration, the resource configuration configuring one or more ZP CSI-RS resources 106 — Receive, from the BS, first DCI scheduling a multicast PDSCH, the first DCI including a first field for triggering aperiodic ZP CSI-RS 108 — Determine, based on the first field, a first ZP CSI-RS resource set, which is not available for reception of the multicast PDSCH, from a first list of ZP CSI-RS resource sets configured by the first aperiodic resource set configuration, wherein the resource configuration is absent in the first PDSCH configuration

402 — Transmit, to a UE, a first PDSCH configuration in a CFR configuration for multicast PDSCH, the first PDSCH configuration including a first aperiodic resource set configuration

404 — Transmit, to the UE, a second PDSCH configuration in a BWP configuration for unicast PDSCH, the second PDSCH configuration including a resource configuration and a second aperiodic resource set configuration, the resource configuration configuring one or more ZP CSI-RS resources

406 — Transmit, to the UE, first DCI scheduling a multicast PDSCH, the first DCI including a first field for triggering aperiodic ZP CSI-RS, wherein the ZP CSI-RS resource configuration is absent in the first PDSCH configuration, and the first field enables the UE to determine a first ZP CSI-RS resource set, which is not available for reception of the multicast PDSCH, from a first list of ZP CSI-RS resource sets configured by the first aperiodic resource set configuration

408 — Transmit, to the UE, second DCI scheduling a unicast PDSCH, the second DCI including a second field for triggering aperiodic ZP CSI-RS, wherein the second field enables the UE to determine a second ZP CSI-RS resource set, which is not available for reception of the unicast PDSCH, from a second list of ZP CSI-RS resource sets configured by the second aperiodic resource set configuration

FIG. 4

USER EQUIPMENT AND METHOD FOR HANDLING PHYSICAL DOWNLINK SHARED CHANNEL RECEPTION

CROSS-REFERENCE TO RELATED APPLICATION(S)

The present disclosure claims the benefit of and priority to U.S. Provisional Patent Application Ser. No. 63/260,041, filed on Aug. 6, 2021, entitled "DCI SIZE ALIGNMENT FOR UNICAST AND MULTICAST TRANSMISSION," and U.S. Provisional Patent Application Ser. No. 63/260,043, filed on Aug. 6, 2021, entitled "MULTICAST PDCCH/PDSCH TRANSMISSION BASED ON CFR CONFIGURATIONS," the contents of all of which are hereby incorporated fully by reference into the present disclosure for all purposes.

FIELD

The present disclosure is related to wireless communication, and more specifically, to a user equipment (UE) and a method for handling physical downlink shared channel (PDSCH) reception in the next-generation wireless communication network.

BACKGROUND

With the tremendous growth in the number of connected devices and the rapid increase in user/network traffic volume, various efforts have been made to improve different aspects of wireless communication for the next-generation wireless communication system, such as $5^{th}$ Generation (5G) New Radio (NR), by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications for the next-generation wireless communication systems.

SUMMARY

The present disclosure is related to a method for handling PDSCH reception by a UE.

According to a first aspect of the present disclosure, a method performed by a UE for handling PDSCH reception is provided. The method includes receiving, from a base station (BS), a first PDSCH configuration in a common frequency resource (CFR) configuration for a multicast PDSCH, the first PDSCH configuration including a first aperiodic resource set configuration; receiving, from the BS, a second PDSCH configuration in a bandwidth part (BWP) configuration for a unicast PDSCH, the second PDSCH configuration including a resource configuration and a second aperiodic resource set configuration, the resource configuration for configuring one or more zero-power (ZP) channel state information-reference signal (CSI-RS) resources; receiving, from the BS, first downlink control information (DCI) scheduling the multicast PDSCH, the first DCI including a first field for triggering a first aperiodic ZP CSI-RS; and determining, based on the first field, a first ZP CSI-RS resource set, which is not available for reception of the multicast PDSCH, from a first list of ZP CSI-RS resource sets configured by the first aperiodic resource set configuration, wherein the resource configuration is absent in the first PDSCH configuration, and each of the first list of ZP CSI-RS resource sets includes at least one of the one or more ZP CSI-RS resources.

According to an implementation of the first aspect, the method further includes receiving, from the BS, second DCI scheduling the unicast PDSCH, the second DCI including a second field for triggering a second aperiodic ZP CSI-RS; and determining, based on the second field, a second ZP CSI-RS resource set, which is not available for reception of the unicast PDSCH, from a second list of ZP CSI-RS resource sets configured by the second aperiodic resource set configuration, wherein each of the second list of ZP CSI-RS resource sets includes at least one of the one or more ZP CSI-RS resources.

According to a second aspect of the present disclosure, a UE for handling PDSCH reception is provided. The UE includes one or more non-transitory computer-readable media having computer-executable instructions embodied therein; and at least one processor coupled to the one or more non-transitory computer-readable media, the at least one processor configured to execute the computer-executable instructions to cause the UE to receive, from a BS, a first PDSCH configuration in a CFR configuration for a multicast PDSCH, the first PDSCH configuration including a first aperiodic resource set configuration; receive, from the BS, a second PDSCH configuration in a BWP configuration for a unicast PDSCH, the second PDSCH configuration including a resource configuration and a second aperiodic resource set configuration, the resource configuration for configuring one or more ZP CSI-RS resources; receive, from the BS, first DCI scheduling the multicast PDSCH, the first DCI including a first field for triggering a first aperiodic ZP CSI-RS; and determine, based on the first field, a first ZP CSI-RS resource set, which is not available for reception of the multicast PDSCH, from a first list of ZP CSI-RS resource sets configured by the first aperiodic resource set configuration, wherein the resource configuration is absent in the first PDSCH configuration, and each of the first list of ZP CSI-RS resource sets includes at least one of the one or more ZP CSI-RS resources.

According to a third aspect of the present disclosure, a method performed by a BS for handling PDSCH transmission is provided. The method includes transmitting, to a UE, a first PDSCH configuration in a CFR configuration for a multicast PDSCH, the first PDSCH configuration including a first aperiodic resource set configuration; transmitting, to the UE, a second PDSCH configuration in a BWP configuration for a unicast PDSCH, the second PDSCH configuration including a resource configuration and a second aperiodic resource set configuration, the resource configuration for configuring one or more ZP CSI-RS resources; and transmitting, to the UE, first DCI scheduling the multicast PDSCH, the first DCI including a first field for triggering a first aperiodic ZP CSI-RS, wherein the first field enables the UE to determine a first ZP CSI-RS resource set, which is not available for reception of the multicast PDSCH, from a first list of ZP CSI-RS resource sets configured by the first aperiodic resource set configuration, the resource configuration is absent in the first PDSCH configuration, and each of the first list of ZP CSI-RS resource sets includes at least one of the one or more ZP CSI-RS resources.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

FIG. 1 is a flowchart illustrating a method performed by a UE for handling PDSCH reception, according to an example implementation of the present disclosure.

FIG. 4 is a flowchart illustrating a method performed by a BS for handling PDSCH transmission, according to an example implementation of the present disclosure.

DESCRIPTION

Figure 2:
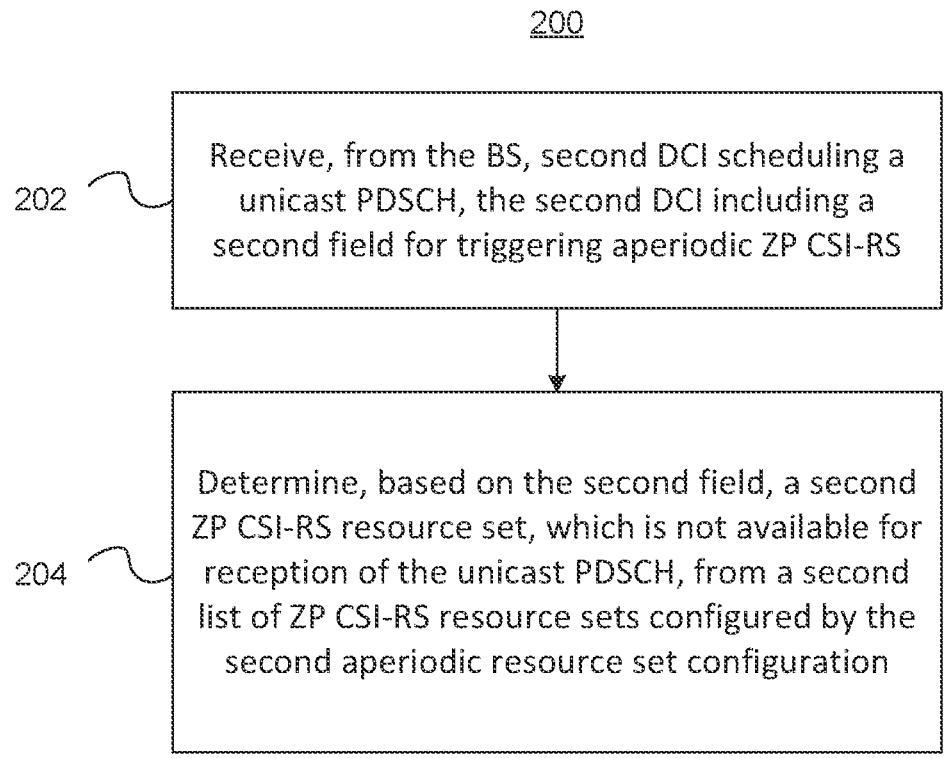
FIG. 2 is a flowchart illustrating a method performed by a UE for handling PDSCH reception, according to an example implementation of the present disclosure.

The acronyms in the present disclosure are defined as follows and unless otherwise specified, the acronyms have the following meanings:

| Abbreviation | Full name |
| --- | --- |
| 3 GPP | 3$^{rd}$ Generation Partnership Project |
| 5G | 5$^{th}$ Generation |
| 5GC | 5G Core |
| ACK | Acknowledgment |
| ARQ | Automatic Repeat Request |
| BA | Bandwidth Adaptation |
| BS | Base Station |
| BSC | Base Station Controller |
| BWP | Bandwidth Part |
| C-RNTI | Common-Radio Network Temporary Identifier |
| CA | Carrier Aggregation |
| CFR | Common Frequency Resource |
| CN | Core Network |
| CORESET | Control Resource Set |
| CP | Cyclic Prefix |
| CRC | Cyclic Redundancy Check |
| CS-RNTI | Configured Scheduling-Radio Network Temporary Identifier |
| CSI-RS | Channel State Information-Reference Signal |
| CSS | Common Search Space |
| DAI | Downlink Assignment Index |
| DC | Dual Connectivity |
| DCI | Downlink Control Information |
| DL | Downlink |
| DRB | Data Radio Bearer |
| E-UTRA(N) | Evolved Universal Terrestrial Radio Access (Network) |
| eMBB | enhanced Mobile Broadband |
| eNB | evolved Node B |
| EN-DC | E-UTRA NR Dual Connectivity |
| EPC | Evolved Packet Core |
| FDRA | Frequency Domain Resource Assignment |
| FEC | Forward Error Correction |
| G-RNTI | Group-Radio Network Temporary Identifier |
| gNB | Next-Generation Node B |
| GSM | Global System for Mobile communications |
| HARQ | Hybrid Automatic Repeat Request |
| HARQ-ACK | HARQ-Acknowledgment |
| ID | Identifier/Identity |
| IE | Information Element |
| LCID | Logical Channel Identifier |
| LDPC | Low-Density Parity-Check |
| LTE | Long Term Evolution |
| LTE-A | LTE-Advanced |
| LSB | Least Significant Bit |
| MAC | Medium Access Control |
| MAC CE | Medium Access Control Control Element |
| MBS | Multicast Broadcast Service |
| MCCH | Multicast Control Channel |
| MCG | Master Cell Group |
| MCS | Modulation and Coding Scheme |
| MCS-C-RNTI | MCS Common-Radio Network Temporary Identifier |
| MeNB | Master eNB |
| mMTC | massive Machine-Type Communication |
| MN | Master Node |
| MR-DC | Multi-RAT Dual Connectivity |
| MSB | Most Significant Bit |
| MSGB | Message B |
| NACK | Negative Acknowledgment |
| NB | Node B |
| NG | Next-Generation |
| ng-eNB | next-generation eNB |
| NGC | Next-Generation Core |
| NPN | Non-Public Network |
| NR | New Radio |
| NUL | Normal Uplink |
| OFDM | Orthogonal Frequency-Division Multiplexing |
| P-RNTI | Paging-Radio Network Temporary Identifier |
| PBCH | Physical Broadcast Channel |
| PCell | Primary Cell |
| PDCCH | Physical Downlink Control Channel |
| PDSCH | Physical Downlink Shared Channel |
| PLMN | Public Land Mobile Network |
| PRACH | Physical Random Access Channel |
| PRB | Physical Resource Block |
| ProSe | Proximity Service |
| PSCell | Primary Secondary Cell/Primary SCG Cell |
| PUCCH | Physical Uplink Control Channel |
| QCL | Quasi-Co-Location |
| RA-RNTI | Random Access-Radio Network Temporary Identifier |
| RAN | Radio Access Network |
| RAT | Radio Access Technology |
| RB | Radio Bearer |
| RBG | Resource Block Group |
| Rel-15 | 3GPP Release 15 |
| Rel-16 | 3GPP Release 16 |
| Rel-17 | 3GPP Release 17 |
| RIV | Resource Indication Value |
| RNC | Radio Network Controller |
| RNTI | Radio Network Temporary Identifier |
| RRC | Radio Resource Control |
| RS | Reference Signal |
| SCell | Secondary Cell |
| SCG | Secondary Cell Group |
| SCS | Sub-Carrier Spacing |
| SFN | System Frame Number |
| SgNB | Secondary gNB |
| SI | System Information |
| SIB | System Information Block |
| SIB1 | System Information Block Type 1 |
| SL | SideLink |
| SN | Secondary Node |
| SNPN | Stand-Alone Non-Public Network |
| SpCell | Special Cell |
| SPS-PDSCH | Semi Persistent Scheduling-PDSCH |
| SRS | Sounding Reference Signal |
| SS | Synchronization Signal |
| SSB | Synchronization Signal Block |
| SUL | Supplementary Uplink |
| TA | Timing Advance/Time Alignment |
| TB | Transport Block |
| TCI | Transmission Configuration Indicator |
| TPC | Transmit Power Control |
| TS | Technical Specification |
| UE | User Equipment |
| UL | Uplink |
| UMTS | Universal Mobile Telecommunications System |
| URLLC | Ultra-Reliable Low-Latency Communication |
| USS | UE-specific Search Space |
| UTRAN | Universal Terrestrial Radio Access Network |
| V2X | Vehi cl e-to-Every thing |
| VRB | Virtual Resource Block |
| WI | Working Item |
| ZP | Zero-Power |

The following contains specific information related to example implementations of the present disclosure. The drawings and their accompanying detailed description are merely directed to example implementations. However, the present disclosure is not limited to these example implementations. Other variations and implementations of the present disclosure will be obvious to those skilled in the art.

Unless noted otherwise, like or corresponding elements among the drawings may be indicated by like or corresponding reference designators. Moreover, the drawings and illustrations in the present disclosure are generally not to scale, and are not intended to correspond to actual relative dimensions.

For the purpose of consistency and ease of understanding, like features may be identified (although, in some examples, not illustrated) by the same reference designators in the drawings. However, the features in different implementations may differ in other respects and shall not be narrowly confined to the implementations illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

The terms "if", "in a case that", "while", "when", "after", "upon", and "once" may be used interchangeably. The terms "according to", "based on", "through", and "via" may be used interchangeably.

The terms "determine", "decide", and "select" may be used interchangeably. The terms "determined", "defined", "configured", "given", "predetermined", "predefined", "pre-configured", and "pre-given" may be used interchangeably. The terms "operate", "implement", and "perform" may be used interchangeably.

For the purposes of explanation and non-limitation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuitry (ASIC), programmable logic arrays, and/or using one or more Digital Signal Processors (DSPs). Although some of the disclosed implementations are oriented to software installed and executing on computer hardware, alternative example implementations implemented as firmware or as hardware or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as an LTE system, an LTE-A system, an LTE-Advanced Pro system, or a 5G NR RAN may typically include at least one BS, at least one UE, and one or more optional network elements that provide connection within a network. The UE may communicate with the network such as a CN, an EPC network, an E-UTRAN, an NGC, a 5GC, or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least an RAT such as Worldwide Interoperability for Microwave Access (WiMAX), Global System for Mobile communications (GSM that is often referred to as 2G), GSM Enhanced Data rates for GSM Evolution (EDGE) RAN (GERAN), General Packet Radio Service (GPRS), Universal Mobile Telecommunication System (UMTS that is often referred to as 3G) based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, an NB in the UMTS, an eNB in LTE or LTE-A, an RNC in UMTS, a BSC in the GSM/GERAN, an ng-eNB in an E-UTRA BS in connection with 5GC, a gNB in the 5G-RAN (or in the 5G Access Network (5G-AN)), or any other apparatus capable of controlling radio communication and managing radio resources within a cell. The BS may serve one or more UEs via a radio interface.

The BS may be operable to provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate SL resources for supporting ProSe, LTE SL services, and/or LTE/NR V2X services. Each cell may have overlapped coverage areas with other cells.

In MR-DC cases, the primary cell of an MCG or an SCG may be called an SpCell. A PCell may refer to the SpCell of an MCG. A PSCell may refer to the SpCell of an SCG. An MCG may refer to a group of serving cells associated with the MN, comprising the SpCell and optionally one or more SCells. An SCG may refer to a group of serving cells associated with the SN, comprising the SpCell and optionally one or more SCells.

As disclosed above, the frame structure for NR supports flexible configurations for accommodating various next-generation (e.g., 5G) communication requirements such as eMBB, mMTC, and URLLC, while fulfilling high reliability, high data rate and low latency requirements. The OFDM technology in the 3GPP may serve as a baseline for an NR waveform. The scalable OFDM numerology such as adaptive sub-carrier spacing, channel bandwidth, and CP may also be used.

Two coding schemes are considered for NR, specifically LDPC code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable (e.g., based on the network dynamics of NR). SL resources may also be provided in an NR frame to support ProSe services, V2X services (e.g., E-UTRA V2X SL communication services) or SL services (e.g., NR SL communication services). In contrast, SL resources may also be provided in an E-UTRA frame to support ProSe services, V2X services (e.g., E-UTRA V2X SL communication services) or SL services (e.g., NR SL communication services).

Multiple PLMNs may operate on an unlicensed spectrum. Multiple PLMNs may share the same unlicensed carrier. The PLMNs may be public or private. Public PLMNs may be (but not limited to) operators or virtual operators, which provide radio services to public subscribers. Public PLMNs may own a licensed spectrum and support an RAT on the licensed spectrum as well. Private PLMNs may be (but not limited to) micro-operators, factories, or enterprises, which provide radio services to its private users (e.g., employees or machines). Public PLMNs may support more deployment scenarios (e.g., CA between licensed band NR (PCell) and NR-Unlicensed (NR-U) (SCell), DC between licensed band LTE (PCell) and NR-U (PSCell), stand-alone NR-U, an NR cell with DL in an unlicensed band and UL in a licensed band, DC between licensed band NR (PCell) and NR-U (PSCell)). Private PLMNs may support (but not limited to) stand-alone unlicensed RAT (e.g., stand-alone NR-U).

Any two or more than two of the following sentences, paragraphs, (sub)-bullets, points, actions, behaviors, terms, alternatives, aspects, examples, or claims described in the following disclosure may be combined logically, reasonably, and properly to form a specific method.

Any sentence, paragraph, (sub)-bullet, point, action, behaviors, terms, alternatives, aspects, examples, or claims described in the following disclosure may be implemented independently and separately to form a specific method.

Dependency (e.g., "based on", "more specifically", "preferably", "In one embodiment", "In some implementations", "In one alternative", "In one example", "In one aspect", or etc.) in the following disclosure is just one possible example which would not restrict the specific method.

Example description of some selected terms, examples, embodiments, implementations, actions, and/or behaviors used in the present disclosure are given as follows.

The terms "network", "RAN", "cell", "camped cell", "serving cell", "BS", "gNB", "eNB" and "ng-eNB" may be used interchangeably. In some implementations, some of these items may refer to the same network entity.

Cell: A cell may be a radio network object that can be uniquely identified by a UE from a (cell) identification that is broadcast over a geographical area from one UTRAN Access Point. The Cell may be either FDD or TDD mode.

Serving cell: For a UE in an RRC connected state (e.g., RRC_CONNECTED state) not configured with CA or DC, there may be only one serving cell, which may be referred to as a PCell. For a UE in RRC_CONNECTED state configured with CA or DC, the term "serving cells" may be used to denote a set of cells comprising SpCell(s) and all SCells. For example, the serving cell may be a PCell, a PSCell, or an SCell described in the TS 38.331.

A UE (operating) in RRC_CONNECTED state may refer to an RRC_CONNECTED UE. A UE (operating) in an RRC idle state (e.g., RRC_IDLE state) may refer to an RRC_IDLE UE. A UE (operating) in an RRC inactive state (e.g., RRC_INACTIVE state) may refer to an RRC_INACTIVE UE.

SpCell: For DC operation, the term SpCell may refer to a PCell of an MCG or a PSCell of an SCG. Otherwise, the term SpCell may refer to the PCell.

MR-DC: An MR-DC may be DC between E-UTRA and NR nodes, or between two NR nodes. The MR-DC may include EN-DC, NR-E-UTRA Dual Connectivity (NE-DC), NG-RAN E-UTRA-NR Dual Connectivity (NGEN-DC), and NR-NR Dual Connectivity (NR-DC) (mode).

MCG: An MCG may be, in MR-DC, a group of serving cells associated with an MN comprising an SpCell (e.g., PCell) and optionally one or more SCells.

MN: An MN may be, in MR-DC, a radio access node that provides a control plane connection to a CN. The MN may be a Master eNB (in EN-DC), a Master ng-eNB (in NGEN-DC), or a Master gNB (in NR-DC and NE-DC).

SCG: An SCG may be, in MR-DC, a group of serving cells associated with an SN comprising an SpCell (e.g., PSCell) and optionally one or more SCells.

SN: An SN may be, in MR-DC, a radio access node, with no control plane connection to a CN, providing additional resources to a UE. The SN may be an en-gNB (in EN-DC), a Secondary ng-eNB (in NE-DC), or a Secondary gNB (in NR-DC and NGEN-DC).

MeNB: An MeNB may be an eNB as a master node associated with an MCG in MR-DC (scenarios).

SgNB: An SgNB may be a gNB as a secondary node associated with an SCG in MR-DC (scenarios).

BWP: In some implementations, a BWP may be a subset of the total cell bandwidth of a cell. By configuring one or more BWPs to the UE and informing the UE that which of the configured BWPs is the currently the active BWP, BA may be achieved. To enable BA mechanism on the PCell, the gNB may configure the UE with one or more UL and DL BWPs. In case of CA, to enable the BA mechanism on Scell(s), the gNB may configure the UE with one or more DL BWPs at least (which means that there may be no UL BWPs configured to the UE). For the PCell, the initial BWP may be the BWP used for initial access. For the SCell(s), the initial BWP may be the BWP configured for the UE to first operate during the SCell activation process. In some implementations, the UE may be configured with a first active UL BWP by a "firstActiveUplinkBWP" IE/field. If the first active UL BWP is configured for an SpCell, the "firstActiveUplinkBWP" IE/field may include the ID of the UL BWP to be activated when the RRC (re)configuration is performed. If the field is absent, the RRC (re)configuration may not trigger a BWP switch. If the first active UL BWP is configured for an SCell, the "firstActiveUplinkBWP" IE/field may include the ID of the UL BWP to be used upon the MAC-activation of the SCell.

HARQ-ACK: In some implementations, an HARQ may be a scheme that combines an ARQ error control mechanism and an FEC coding in which unsuccessful attempts are used in FEC decoding instead of being discarded. In some implementations, HARQ-ACK feedback may be used to indicate whether a HARQ process is successfully performed.

PDSCH-Config: In some implementations, a "PDSCH-Config" IE may be a configuration/parameter used for configuring (or indicating) PDSCH parameters to a UE.

DCI format 1_0: In some implementations, a DCI format 1_0 may be used for scheduling of PDSCH in one DL cell. The DCI format 1_0 with CRC scrambled by C-RNTI/CS-RNTI/MCS-C-RNTI may include at least one of the following information/fields:

Identifier for DCI formats: 1 bit. The value of this bit field may be (always) set to 1 for indicating a DL DCI format.

Frequency domain resource assignment: $\lceil \log_2(N_{RB}^{DL\text{-}BwP}(N_{RB}^{DL\text{-}BwP}+1)/2) \rceil$ bits. If the CRC of the DCI format 1_0 is scrambled by C-RNTI and the "Frequency domain resource assignment" field are of all ones, the DCI format 1_0 may be for random access procedure initiated by a PDCCH order.

If the CRC of the DCI format 1_0 is scrambled by C-RNTI and the "Frequency domain resource assignment" field are of all ones, all remaining information/fields may be set as follows:

Random Access Preamble index: 6 bits according to ra-PreambleIndex as described in TS 38.321.

UL/SUL indicator: 1 bit. If the value of the "Random Access Preamble index" is not all zeros and if the UE is configured with "supplementaryUplink" in "ServingCellConfig" in the cell, this field may indicate which UL carrier in the cell shall be used to transmit the PRACH; otherwise, this field may be reserved.

SS/PBCH index: 6 bits. If the value of the "Random Access Preamble index" is not all zeros, this field may indicate the SS/PBCH that shall be used to determine the RACH occasion for the PRACH transmission; otherwise, this field may be reserved.

PRACH Mask index: 4 bits. If the value of the "Random Access Preamble index" is not all zeros, this field may indicate the RACH occasion associated with the SS/PBCH indicated by "SS/PBCH index" for the PRACH transmission as described in TS 38.321; otherwise, this field may be reserved.

Reserved bits: 12 bits for operation in a cell with shared spectrum channel access; otherwise 10 bits.

Otherwise, all remaining information/fields may be set as follows:

Time domain resource assignment: 4 bits as described in TS 38.214.

VRB-to-PRB mapping: 1 bit.

Modulation and coding scheme: 5 bits as described in TS 38.214.

New data indicator: 1 bit.

Redundancy version: 2 bits.

HARQ process number: 4 bits.

Downlink assignment index: 2 bits as described in TS 38.213, as counter DAI.

TPC command for scheduled PUCCH: 2 bits as described in TS 38.213.

PUCCH resource indicator: 3 bits as described in 5, TS 38.213.

PDSCH-to-HARQ feedback timing indicator: 3 bits as described in TS 38.213.

ChannelAccess-CPext: 2 bits. This field may be used for indicating combinations of channel access type and CP extension if "ChannelAccessMode-r16"='semistatic' is provided for operation in a cell with shared spectrum channel access; 0 bits otherwise.

The DCI format 1_0 with CRC scrambled by P-RNTI may include at least one of the following information/fields:

Short Messages Indicator: 2 bits as described in TS 38.212 or below Table 1.

Short Messages: 8 bits as described in TS 38.331. If only the scheduling information for Paging is carried, this bit field may be reserved.

Frequency domain resource assignment: $\lceil \log_2(N_{RB}^{DL,BWP}(N_{RB}^{DL,BWP}+1)/2) \rceil$ bits. If only the short message is carried, this bit field may be reserved. $N_{RB}^{DL,BWP}$ may be the size of CORESET 0.

Time domain resource assignment: 4 bits as described in TS 38.214. If only the short message is carried, this bit field may be reserved.

VRB-to-PRB mapping: 1 bit. If only the short message is carried, this bit field may be reserved.

Modulation and coding scheme: 5 bits as described in TS 38.214. If only the short message is carried, this bit field may be reserved.

TB scaling: 2 bits as described in TS 38.214. If only the short message is carried, this bit field may be reserved.

Reserved bits: 8 bits for operation in a cell with shared spectrum channel access; otherwise 6 bits.

Table 1 illustrates an example short message indicator.

TABLE 1

| Bit Field | Short Message Indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

The DCI format 1_0 with CRC scrambled by SI-RNTI may include at least one of the following information/fields:

Frequency domain resource assignment: $\lceil \log_2(N_{RB}^{DL,BWP}(N_{RB}^{DL,BWP}+1)/2) \rceil$ bits. $N_{RB}^{DL,BWP}$ may be the size of CORESET 0.

Time domain resource assignment: 4 bits as described in TS 38.214.

VRB-to-PRB mapping: 1 bit.

Modulation and coding scheme: 5 bits as described in TS 38.214.

Redundancy version: 2 bits.

System information indicator: 1 bit as described in below Table 2.

Reserved bits: 17 bits for operation in a cell with shared spectrum channel access; otherwise 15 bits.

Table 2 illustrates an example system information indicator. Details of SIB1 and SI message may be described in TS 38.331

TABLE 2

| Bit Field | System Information Indicator |
|---|---|
| 0 | SIB1 |
| 1 | SI message |

The DCI format 1_0 with CRC scrambled by RA-RNTI or MsgB-RNTI may include at least one of the following information/fields:

Frequency domain resource assignment: $\lceil \log_2(N_{RB}^{DL,BWP}(N_{RB}^{DL,BWP}+1)/2) \rceil$ bits. $N_{RB}^{DL,BWP}$ may be the size of CORESET 0 if the CORESET 0 is configured for the cell. $N_{RB}^{DL,BWP}$ may be the size of initial DL BWP if the CORESET 0 is not configured for the cell.

Time domain resource assignment: 4 bits as described in TS 38.214.

VRB-to-PRB mapping: 1 bit.

Modulation and coding scheme: 5 bits as described in TS 38.214.

TB scaling: 2 bits as described in TS 38.214.

LSBs of SFN: 2 bits for the DCI format 1_0 with CRC scrambled by MsgB-RNTI as described in TS 38.213 if "msgB-responseWindow" is configured to be larger than 10 ms; or 2 bits for the DCI format 1_0 with CRC scrambled by RA-RNTI as described in TS 38.213 for operation in a cell with shared spectrum channel access if "ra-ResponseWindow" or "ra-ResponseWindow-v1610" is configured to be larger than 10 ms; 0 bit otherwise.

Reserved bits: (16-A) bits for operation in a cell without shared spectrum access; or (18-A) bits for operation in a cell with shared spectrum access. The value of A may be the number of bits for the field of "LSBs of SFN".

The DCI format 1_0 with CRC scrambled by TC-RNTI may include at least one of the following information/fields:

Identifier for DCI formats: 1 bit. The value of this bit field may be (always) set to 1 for indicating a DL DCI format.

Frequency domain resource assignment: $\lceil \log_2(N_{RB}^{DL,BWP}(N_{RB}^{DL,BWP}+1)/2) \rceil$ bits. $N_{RB}^{DL,BWP}$ may be the size of CORESET 0.

Time domain resource assignment: 4 bits as described in TS 38.214.

VRB-to-PRB mapping: 1 bit.

Modulation and coding scheme: 5 bits as described in TS 38.214.

New data indicator: 1 bit.

Redundancy version: 2 bits.

HARQ process number: 4 bits.

Downlink assignment index: 2 bits, reserved.

TPC command for scheduled PUCCH: 2 bits as described in TS 38.213.

PUCCH resource indicator: 3 bits as described in TS 38.213.

PDSCH-to-HARQ feedback timing indicator: 3 bits as described in TS 38.213.

ChannelAccess-CPext: 2 bits. This field may be used for indicating combinations of channel access type and CP extension if "ChannelAccessMode-r16"='semistatic' is provided for operation in a cell with shared spectrum channel access; otherwise 0 bit.

Configurations associated with rate match (e.g., for configuring resources patterns for rate matching of PDSCH receptions) may be included in the "PDSCH-Config" IE. Table 3 illustrates the configurations associated with rate match.

TABLE 3

| | |
|---|---|
| rateMatchPatternToAddModList (1..maxNrofRateMatchPatterns)) OF RateMatchPattern | SEQUENCE (SIZE OPTIONAL, -- Need N |
| rateMatchPatternToReleaseList (1..maxNrofRateMatchPatterns)) OF RateMatchPatternId OPTIONAL, -- Need N | SEQUENCE (SIZE |
| rateMatchPatternGroup1 OPTIONAL, -- Need R | RateMatchPatternGroup |
| rateMatchPatternGroup2 OPTIONAL, -- Need R | RateMatchPatternGroup |

Table 4 illustrates an example "RateMatchPatternGroup".

TABLE 4

| | |
|---|---|
| RateMatchPatternGroup ::= (1..maxNrofRateMatchPatternsPerGroup)) OF CHOICE { cellLevel bwpLevel } | SEQUENCE (SIZE RateMatchPatternId, RateMatchPatternId |

Table 5 illustrates an example "RateMatchPattern".

TABLE 5

| | |
|---|---|
| RateMatchPattern ::= rateMatchPatternId patternType | SEQUENCE { RateMatchPatternId, CHOICE { |

TABLE 5-continued

```
  bitmaps                              SEQUENCE {
    resourceBlocks                       BIT STRING (SIZE (275)),
    symbolsInResourceBlock               CHOICE {
      oneSlot                              BIT STRING (SIZE (14)),
      twoSlots                             BIT STRING (SIZE (28))
    },
    periodicityAndPattern                CHOICE {
      n2                                   BIT STRING (SIZE (2)),
      n4                                   BIT STRING (SIZE (4)),
      n5                                   BIT STRING (SIZE (5)),
      n8                                   BIT STRING (SIZE (8)),
      n10                                  BIT STRING (SIZE (10)),
      n20                                  BIT STRING (SIZE (20)),
      n40                                  BIT STRING (SIZE (40))
    }
OPTIONAL, -- Need S
  ...
  },
  controlResourceSet                   ControlResourceSetId
},
subcarrierSpacing                      SubcarrierSpacing
OPTIONAL, -- Cond CellLevel
dummy                                  ENUMERATED { dynamic,
semiStatic },
...,
[[
controlResourceSet-r16                 ControlResourceSetId-r16
OPTIONAL -- Need R
]]
}
```

SI may refer to MIB, SIB1, and other SI. Minimum SI may include MIB and SIB1. Other SI may refer to SIB3, SIB4, SIB5, and other SIB(s) (e.g., SNPN-specific SIB, PNI-NPN-specific SIB).

Dedicated signaling may refer to (but not limited to) RRC message(s). For example, the RRC message(s) may include an RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. RRC message may be one kind of dedicated signaling. The UE may receive the RRC message from the network via unicast/broadcast/groupcast.

The disclosed mechanism may be applied to any RAT. The RAT may be (but not limited to) NR, NR-U, LTE, E-UTRA connected to 5GC, LTE connected to 5GC, E-UTRA connected to EPC, and LTE connected to EPC. The disclosed mechanism may be applied for UEs in public networks, or in private networks (e.g., NPN, SNPN, and PNI-NPN).

The disclosed mechanism may be used for licensed frequency and/or unlicensed frequency.

Generally, the disclosed mechanisms may be (but not limited to) applied for the PCell and the UE. In addition, the mechanisms described in the present disclosure may be applied for the PSCell and the UE.

In the present disclosure, the terms "IE" and "field" may be used interchangeably.

In Rel-15 and Rel-16 NR, the features of broadcast and multicast supported in NR have not been specified. Considering that broadcast and/or multicast could provide substantial improvements for important use cases, especially in regard to system efficiency and user experience, it is beneficial to enable broadcast and/or multicast services (e.g., general MBS services) over 5GS. The uses cases that may benefit from this feature include public safety, mission critical, and V2X applications, etc. In 3GPP RAN #88-e, a new WI MBS was agreed with an objective of specifying a group scheduling mechanism to allow UEs to receive the broadcast and/or multicast services.

In some implementations, broadcast and/or multicast services may be provided to a group of UEs via dynamic PDSCH(s) or SPS PDSCH(s). To provide the broadcast and/or multicast services, a gNB may schedule a group common PDSCH that is receivable for the group of UEs via a group common PDCCH that is receivable for the group of UEs. In some other implementations, the gNB may separately schedule a unicast PDSCH that is receivable for each UE of the group of UEs via a dedicated PDCCH that is receivable for each UE of the group of UEs. In some other implementations, the gNB may schedule the group common PDSCH that is receivable for the group of UEs via a separate dedicated PDCCH that is receivable for each UE of the group of UEs. Using the group common PDCCH or the group common PDSCH has the benefit of resource efficiency, since the same information only needs to be transmitted once. On the other hand, using the dedicated PDCCH or the dedicated PDSCH has the benefit of scheduling flexibility, since the gNB can schedule a specific UE based on a UE capability and channel condition(s) for the specific UE.

In some implementations, a narrow beam or more accurate precoding may be used for the dedicated PDCCH or the dedicated PDSCH. Combined usage of the implementations may also be beneficial. For example, resource efficiency may be improved when the gNB schedules the group common PDSCH via the group common PDCCH for the group of UEs except for some UEs with relatively worse channel condition compared to other UEs of the group of UEs, since MCSs of the group common PDCCH and group common PDSCH may not need to be selected based on the worse channel condition.

To enable scheduling of group common PDSCH(s), CFR(s) may be configured. A CFR may be configured within an active DL BWP of a UE. That is, the frequency resources of the active DL BWP may include the frequency resources of the CFR. In the present disclosure, the active DL BWP may include the CFR is equivalent to that the frequency resources of the active DL BWP may include the frequency resources of the CFR. Configuration of the CFR may be provided to the UE via SI or via dedicated signaling (e.g., RRC signaling). The configuration of the CFR may be provided together with associated configurations of PDCCH, PDSCH, and PUCCH for the CFR. For example, a CFR configuration (IE) may include at least one of PDCCH-Config, PDSCH-Config, or "PUCCH-ConfigurationList" (IE). It should be noted that the PDCCH-Config, the PDSCH-Config, and the PUCCH-ConfigurationList in the CFR configuration may be different from those in a dedicated BWP configuration of the UE.

A group common PDCCH transmitted within a CFR may be transmitted based on the configuration provided in the PDCCH-Config associated with the CFR. Similar to the PDCCH-Config for a DL BWP, the PDCCH-Config associated with the CFR may include configurations of CORESETs and search spaces associated with the CORESETs within the CFR. A group common PDSCH transmitted within a CFR may be transmitted based on the configuration provided in the PDSCH-Config associated with the CFR.

The group common PDCCH may be transmitted in a search space configured for a group of UEs. The search space may be a Type 3 CSS or a Type 4 CSS based on the configuration in PDCCH-Config associated with the CFR. The group common PDCCH may include a specific DCI format configured or defined for the group common PDCCH. For example, the DCI format may be a DCI format 1_0 with CRC scrambled by G-RNTI, a DCI format 1_1, or a DCI format 1_2 with CRC scrambled by G-RNTI. Alternatively, the DCI format may be a new DCI format (e.g., DCI format 1_3).

In the present disclosure, two new DCI formats may be used for scheduling a group common PDSCH. The first new DCI format may be referred to as DCI format M_0. The second new DCI format may be referred to as DCI format M_1.

In Rel-15 NR, to reduce UE complexity, a DCI size budget has been specified to limit the total number of different DCI sizes a UE is required to monitor for a cell. The total number of different DCI sizes of DCI formats the UE is required to monitor for the cell may be not more than 4. The total number of different DCI sizes of the DCI formats with CRC scrambled by C-RNTI the UE is required to monitor for the cell may be not more than 3. A procedure for DCI size alignment has been specified to handle the DCI size budget.

The procedure for DCI size alignment may include, but is not limited to, the following steps.

Step 1: The sizes of a DCI format 0_0 and a DCI format 1_0 that are monitored in all CSS may be aligned by determining the length of an FDRA field based on the size of an initial DL BWP or the size of CORESET 0 (if the CORESET 0 is configured), and the size of an initial UL BWP for the DCI format 1_0 and the DCI format 0_0, respectively. If the DCI sizes are different for the two DCI formats, zeros may be padded to the DCI format 0_0 until the two DCI formats have the same size (e.g., if the size of the DCI format 0_0 is smaller than the size of the DCI format 1_0). The MSB bits of the FDRA field may be truncated until the two DCI formats have the same size if the size of the DCI format 0_0 is larger than the size of the DCI format 1_0.

Step 2: The sizes of the DCI format 0_0 and the DCI format 1_0 that are monitored in a USS may be aligned by determining the length of the FDRA field based on the size of an active DL BWP and the size of an active UL BWP for the DCI format 1_0 and the DCI format 0_0, respectively. If the DCI sizes are different for the two DCI formats, zeros may be padded to the DCI format with smaller size until the two DCI formats have the same size.

Step 3-1: The sizes of a DCI format 0_1 and a DCI format 1_1 that are monitored in the USS may be determined by RRC configuration(s) and determined based on the size of the active DL BWP and the size of the active UL BWP for the DCI format 1_1 and the DCI format 0_1, respectively. To avoid DCI format ambiguity, if the size of the DCI format 0_1 or the DCI format 1_1 is equal to the size of the DCI format 0_0 or the DCI format 1_0 in another USS, a zero bit may be padded to the DCI format 0_1 or the DCI format 1_1.

Step 3-2: The sizes of a DCI format 0_2 and a DCI format 1_2 that are monitored in the USS may be determined by RRC configuration(s) and determined based on the size of the active DL BWP and the size of the active UL BWP for the DCI format 0_2 and the DCI format 1_2, respectively.

Step 4: Check whether the DCI size budget is met. If the DCI size budget is not met, go to Step 5-1.

Step 5-1: Remove the zero padded in Step 3-1. The sizes of the DCI format 0_0 and the DCI format 1_0 that are monitored in the USS may be aligned by determining the length of the FDRA field based on the size of the initial DL BWP or the size of the CORESET 0 (if the CORESET 0 is configured), and the size of the initial UL BWP for the DCI format 1_0 and the DCI format 0_0, respectively. If the DCI sizes are different for the two DCI formats, zeros may be padded to the DCI format 0_0 until the two DCI formats have the same size (e.g., if the size of the DCI format 0_0 is smaller than the size of the DCI format 1_0). The MSB bits of the FDRA field may be truncated until the two DCI formats have the same size if the size of the DCI format 0_0 is larger than the size of the DCI format 1_0.

Step 5-2: If the DCI size budget is not met, zeros may be padded to the DCI format 0_2 and the DCI format 1_2 with smaller size until the two DCI formats have the same size.

Step 5-3: If the DCI size budget is not met, zeros may be padded to the DCI format 0_1 and the DCI format 1_1 with smaller size until the two DCI formats have the same size.

PUCCH resource(s) for HARQ-ACK feedback for a group common PDSCH may be configured in "PUCCH-ConfigurationList" that is different from "PUCCH-ConfigurationList" that is used for configuration of PUCCH resource(s) for HARQ-ACK feedback for dedicated PDSCH, CSI, and SR. In other words, the UE may be configured with two PUCCH-ConfigurationList, each may include up to two PUCCH-Config. The first PUCCH-Config in "PUCCH-ConfigurationList" may include configuration(s) of PUCCH resources with lower physical layer priority. The second PUCCH-Config in the PUCCH-ConfigurationList may include configuration(s) of PUCCH resources with higher physical layer priority. The PUCCH-ConfigurationList for group common PDSCH may be configured as part of a CFR configuration or may be configured together with the other PUCCH-ConfigurationList that is used for dedicated PDSCH, CSI, and SR.

In the present disclosure, PUCCH resource(s) configured by "PUCCH-ConfigurationList" for group common PDSCH may be referred to as multicast PUCCH(s). PUCCH resource(s) configured by "PUCCH-ConfigurationList" for dedicated PDSCH, CSI, and SR may be referred to as unicast PUCCH(s). In addition, dedicated PDCCH(s) and dedicated PDSCH(s) may be referred to as unicast PDCCH(s) and unicast PDSCH(s), respectively.

In Rel-15 NR, two types of resource allocations for a PDSCH has been specified. For resource allocation type 0, a bitmap may be used to indicate the allocated VRBs for the PDSCH. Each bit of the bitmap may correspond to an RBG. The RBG may include one or more VRBs. For resource allocation type 1, an RIV may be used to (jointly) indicate a starting VRB ($RB_{start}$) and a total length in terms of contiguously allocated resource blocks $L_{RBs}$. Determination of RIV may be defined as illustrated in Table 6.

TABLE 6

```
if (L_RBs - 1) ≤ [N_BWP^size/2] then
  RIV = N_BWP^size(L_RBs - 1) + RB_start
else
  RIV = N_BWP^size(N_BWP^size - L_RBs + 1) + (N_BWP^size - 1 - RB_start)
```

For determining the MV, $L_{RBS} \geq 1$ and may not exceed $N_{BWP}^{size} - RB_{start}$.

Issues regarding DCI size alignment for unicast and multicast reception/transmission may be described as follows.

Contents of DCI Format M_0 and DCI Format M_1

A DCI format M_0 may be aimed to be receivable for UEs without dedicated RRC configurations. The length of fields of the DCI format may not depend on the dedicated RRC configurations. The DCI format may be used for broadcast services and may also be used for multicast services with less scheduling flexibility. A DCI format M_1 may be aimed to be used for UEs with dedicated RRC configurations. The DCI format may provide more scheduling flexibility and may be used for multicast services. The contents of the DCI formats may need to be defined considering the functionality required for broadcast and multicast services and considering size alignment with legacy DCI formats (e.g., DCI format 1_0, DCI format 1_1 and/or DCI format 1_2).

Implementations for handling the contents of a DCI format M_0 and/or a DCI format M_1 may be described as follows.

In some implementations, a DCI format M_0 may include at least one field of a DCI format 1_0 with CRC scrambled by C-RNTI. The DCI format M_0 may not include at least one of the following fields:
  a "Identifier for DCI formats" field;
  a "TPC command for scheduled PUCCH" field.

In some implementations, the DCI format M_0 may not include at least one of a "Downlink assignment index" field, a "PUCCH resource indicator" field, or a "PDSCH-to-HARQ feedback timing indicator" field when at least one of specific conditions is met. The specific conditions may include, but is not limited to, at least one of the following:
  The DCI format M_0 is used for scheduling a group common PDSCH for a broadcast service.
  The DCI format M_0 is used for scheduling a group common PDSCH for a multicast service and HARQ-ACK feedback for the multicast service is disabled.
  The DCI format M_0 is used for scheduling the group common PDSCH for the multicast service and an explicit RRC parameter used for indicating the presence of the fields in the DCI format M_0 is configured.

In some implementations, a "HARQ-ACK enable/disable" field may be included in the DCI format M_0 if the DCI format M_0 is used for scheduling a group common PDSCH for a multicast service.

In some implementations, the HARQ-ACK feedback for the multicast service may be enabled/disabled by RRC configuration(s). The HARQ-ACK feedback for the multicast service may be enabled/disabled by DCI(s) (e.g., DCI indication(s)) when the "HARQ-ACK enable/disable" field for indicating enabling/disabling of the HARQ-ACK feedback for the multicast service is configured to be included in the DCI(s) by the RRC configuration(s). The RRC configuration(s) may be included in PDSCH-Config associated with a CFR. The presence of the "HARQ-ACK enable/disable" field may be configured per CFR or per multicast service.

The UE may not expect that the "HARQ-ACK enable/disable" field is present for a first multicast service associated with a DCI format and the "HARQ-ACK enable/disable" field is not present for a second multicast service associated with the DCI format in the same CFR. When the "HARQ-ACK enable/disable" field is present for the first multicast service associated with the DCI format and the "HARQ-ACK enable/disable" field is not present for the second multicast service associated with the DCI format in the same CFR, the UE may determine that a number of reserved bits are present in the DCI format used for scheduling the second multicast service. The number of reserved bits is equal to the number of bits of the "HARQ-ACK enable/disable" field in the DCI format used for scheduling the first multicast service.

In some implementations, a "SC-MCCH change notification" field may be included in the DCI format M_0 if the DCI format M_0 is used for scheduling a group common PDSCH for a broadcast service.

Implementations for determining whether the DCI format M_0 is used for scheduling a group common PDSCH for a broadcast service or used for scheduling a group common PDSCH for a multicast service may be described as follows.

In some implementations, the DCI format M_0 may be determined to be used for scheduling the group common PDSCH for the broadcast service if at least one of specific conditions is met. The specific conditions may include, but is not limited to, at least one of the following:
  The DCI format M_0 is detected in a search space associated with CORESET 0 or in a search space associated with a CORESET configured by "commonControlResourceSet" in SIB1.

The DCI format M_0 is with CRC scrambled by a MCCH-RNTI.

The DCI format M_0 is with CRC scrambled by a G-RNTI included in a MTCH configuration.

The DCI format M_0 is with CRC scrambled by an RNTI used for MCCH change notification.

In some implementations, the DCI format M_0 may be determined to be used for scheduling the group common PDSCH for the multicast service if at least one of specific conditions is met. The specific conditions may include, but is not limited to, at least one of the following:

The DCI format M_0 is detected in a search space configured by PDCCH-Config associated with a CFR provided via dedicated RRC signaling.

The DCI format M_0 is with CRC scrambled by a G-RNTI for a multicast service provided via dedicated signaling.

In some implementations, the total length of a "Frequency domain resource assignment" field may be determined based on the total number of PRBs of a CFR for a broadcast service or a multicast service. Specifically, the length of the "Frequency domain resource assignment" field may be $\lceil \log_2(N_{RB}^{DL,CFR}(N_{RB}^{DL,CFR}+1)/2) \rceil$ bits. $N_{RB}^{DL,CFR}$ may be the total number of PRBs of the CFR. For broadcast services, $N_{RB}^{DL,CFR}$ may be determined to be equal to the total number of PRBs of CORESET 0 if no CFR configuration is provided for the broadcast services. The CFR configuration may not (explicitly) indicate the total number of PRBs of the CFR. The CFR configuration may (implicitly) indicate the total number of PRBs of the CFR by the presence of the CFR configuration. For example, when the CFR configuration is present, the total number of PRBs of the CFR may be the same as the total number of PRBs of an initial DL BWP configured by SIB1. The CFR configuration may (only) be present if the initial DL BWP is configured by the SIB1. An example form of the CFR configuration may be illustrated in Table 7.

TABLE 7

| CommonFrequenctResource | ENUMERATED {true} |
|---|---|

In some implementations, a DCI format M_1 may include at least one of fields of a DCI format 1_1 and/or a DCI format 1_2 with CRC scrambled by C-RNTI. The DCI format M_1 may not include at least one of the following fields:

a "Identifier for DCI formats" field;
a "TPC command for scheduled PUCCH" field;
a "Carrier indicator" field;
a "Bandwidth part indicator" field;
a "SRS request" field;
a "SCell dormancy indication" field.

In some implementations, the presence of the fields and the total length of the fields of the DCI format M_1 transmitted in a CFR may depend on configurations included in PDSCH-Config associated with the CFR or may depend on configurations included in the PDCCH-Config associated with the CFR. The fields may include, but is not limited to, a "Frequency domain resource assignment" field, a "Time domain resource assignment" field, a "VRB-to-PRB mapping" field, a "PRB bundling size indicator" field, a "Rate matching indicator" field, a "ZP CSI-RS trigger" field, a "Antenna port(s)" field, a "Transmission configuration indication" field, a "CBG transmission information (CBGTI)" field, a "CBG flushing out information (CBGFI)" field, or a "Priority indicator" field.

In some implementations, the DCI format M_1 may not include at least one of a "Downlink assignment index" field, a "PUCCH resource indicator" field, or a "PDSCH-to-HARQ feedback timing indicator" field when at least one of specific conditions is met. The specific conditions may include, but is not limited to, at least one of the following:

The DCI format M_1 is used to schedule a group common PDSCH for a multicast service and HARQ-ACK feedback for the multicast service is disabled.

The DCI format M_1 is used to schedule the group common PDSCH for the multicast service and an explicit RRC parameter used for indicating the presence of the fields in the DCI format M_0 is configured.

In some implementations, a "HARQ-ACK enable/disable" field may be included in the DCI format M_1 if the DCI format M_1 is used for scheduling a group common PDSCH for a multicast service.

In some implementations, the HARQ-ACK feedback for the multicast service may be enabled/disabled by RRC configuration(s). The HARQ-ACK feedback for the multicast service may be enabled/disabled by DCI(s) (e.g., DCI indication(s)) when the "HARQ-ACK enable/disable" field for indicating enabling/disabling of the HARQ-ACK feedback for the multicast service is configured to be included in the DCI(s) by the RRC configuration(s). The RRC configuration(s) may be included in PDSCH-Config associated with a CFR. The presence of the "HARQ-ACK enable/disable" field may be configured per CFR or per multicast service. The UE may not expect that the "HARQ-ACK enable/disable" field is present for a first multicast service associated with a DCI format and the "HARQ-ACK enable/disable" field is not present for a second multicast service associated with the DCI format in the same CFR. When the "HARQ-ACK enable/disable" field is present for the first multicast service associated with the DCI format and the "HARQ-ACK enable/disable" field is not present for the second multicast service associated with the DCI format in the same CFR, the UE may determine that a number of reserved bits are present in the DCI format used for scheduling the second multicast service. The number of reserved bits is equal to the number of bits of the "HARQ-ACK enable/disable" field in the DCI format used for scheduling the first multicast service.

In some implementations, the total length of the "Frequency domain resource assignment" field may be determined based on the total number of PRBs of a CFR for a broadcast service or a multicast service. Specifically, the total length of the "Frequency domain resource assignment" field may be $\lceil \log_2(N_{RB}^{DL,CFR}(N_{RB}^{DL,CFR}+1)/2) \rceil$ bits. $N_{RB}^{DL,CFR}$ may be the total number of PRBs of the CFR.

In some implementations, the total length of the "Time domain resource assignment" field may be determined based on a "pdsch-TimeDomainAllocationList" field in the PDSCH-Config associated with the CFR. The total length of the field may be determined as $\lceil \log_2(I) \rceil$ bits. I may be the total number of entries in the "pdsch-TimeDomainAllocationList" field in the PDSCH-Config associated with the CFR.

In some implementations, the presence of the "VRB-to-PRB mapping" field may be determined based on whether the "vrb-ToPRB-Interleaver" field is included in the PDSCH-Config associated with the CFR. If the "vrb-To-PRB-Interleaver" field is included in the PDSCH-Config associated with the CFR, the field may be present. Otherwise, the field may not be present.

In some implementations, the presence of the "Transmission configuration indication" field may be determined based on whether the "tci-PresentInDCI" field is included in the CORESET configuration associated with the CFR.

In some implementations, the "CBG transmission information (CBGTI)" field or the "CBG flushing out information (CBGFI)" field may not be present in the DCI format M_1 (e.g., regardless of whether the "codeBlockGroup-Transmission" field or the "pdsch-CodeBlockGroupTransmissionList-r16" field is included in the PDSCH-ServingCellConfig of the serving cell of the CFR).

DCI Size Alignment

The same DCI size budget (e.g., as discussed in Rel-15 NR) may be kept to avoid increasing UE complexity. As such, the procedure for DCI size alignment should be defined considering the DCI format M_0 and the DCI format M_1.

Implementations for handling DCI size alignment(s) for unicast DCI formats and multicast DCI formats may be described as follows. The unicast DCI formats may include at least one of a DCI format 0_0, a DCI format 1_0, a DCI format 0_1, a DCI format 1_1, a DCI format 0_2, or a DCI format 1_2. The multicast DCI formats may include a DCI format M_0 and a DCI format M_1.

In some implementations, to align the sizes of a DCI format M_0 and a DCI format 1_0 in a CSS, zeros may be padded to the DCI format M_0 until the sizes of the DCI format M_0 is the same as the size of the DCI format 1_0 (e.g., if the size of the DCI format M_0 is smaller than the size of the DCI format 1_0). In some other implementations, if the size of the DCI format M_0 is larger than the size of the DCI format 1_0, the MSB bits of an FDRA field in the DCI format M_0 may be truncated until the size of the DCI format M_0 is the same as the size of the DCI format 1_0.

In some implementations, a gNB may configure the total number of PRBs of a CFR associated with the DCI format M_0 such that the truncation of the FDRA field does not happen. For example, if a "Identifier for DCI formats" field and a "TPC command for scheduled PUCCH" field are not included in the DCI format M_0, there may be a 3-bit budget for configuring the total number of PRBs for the CFR. If a cell is configured with CORESET 0 with 24 PRBs, 48 PRBs, or 96 PRBs, the length of a FDRA field of DCI format 1_0 may be 9 bits, 11 bits, and 13 bits, respectively. Hence, with the 3-bit budget, the maximum length of FDRA field of DCI format M_0 may be 12 bits, 14 bits, and 16 bits, which correspond to 90 PRBs, 180 PRBs, and PRBs that can be configured for the CFR.

In some implementations, when the truncation of the FDRA field happens (e.g., to better utilize the configured PRBs within a CFR), type 1 resource allocation may be based on resource block groups. In other words, the starting VRB $RB_{start}$ indicated by an MV may be interpreted as $RB_{start} \cdot K$ and the indicated contiguously allocated resource blocks $L_{RBS}$ may be interpreted as $L_{RBS} \cdot K$. K may be determined as the maximum value from the set $\{1, 2, 4, 8\}$ which satisfies $K \leq \lfloor N^{CFR}/N^{Ref} \rfloor$. Otherwise, K=1. $N^{CFR}$ may be the total number of PRBs of the CFR. In some implementations, $N^{Ref}$ may be a reference number of PRBs, which may be defined as the minimum number of PRBs that results in the length of the FDRA field equal to the length of the truncated FDRA field. For example, if the truncated FDRA field is with 9 bits, $N^{Ref}$ may be equal to 23, since the minimum N that results in $\lceil \log_2(N(N+1)/2) \rceil = 9$ is N=23. In some other implementations, $N^{Ref}$ may be defined as the maximum number of PRBs that results in the length of the FDRA field equal to the length of the truncated FDRA field. In some other implementations, $N^{Ref}$ may be a configured value or may be a configured value selected from a set of values.

In some implementations, to align the sizes of a DCI format 1_1, a DCI format 0_1, a DCI format 1_2, or a DCI format 0_2 with the size of a DCI format M 1 or with the size of a DCI format M_0 in a search space configured by PDCCH-Config associated with a CFR, zeros may be padded to the DCI format 1_1, the DCI format 0_1, the DCI format 1_2, or the DCI format 0_2 until the size of the DCI format 1_1, the DCI format 0_1, the DCI format 1_2, or the DCI format 0_2 is the same as the size of the DCI format M_1 or the DCI format M_0 (e.g., if the size of the DCI format 1_1, the DCI format 0_1, the DCI format 1_2, or the DCI format 0_2 is smaller than the size of the DCI format M_1 or the DCI format M_0). In some other implementations, if the size of the DCI format 1_1, the DCI format 0_1, the DCI format 1_2, or the DCI format 0_2 is larger than the size of the DCI format M_1 or the DCI format M_0, the MSB bits of an FDRA field in the DCI format 1_1, the DCI format 0_1, the DCI format 1_2, or the DCI format 0_2 may be truncated until the size of the DCI format 1_1, the DCI format 0_1, the DCI format 1_2, or the DCI format 0_2 is the same as the size of the DCI format M_1 or the DCI format M_0. In some other implementations, if the size of the DCI format 1_1, the DCI format 0_1, the DCI format 1_2, or the DCI format 0_2 is larger than the size of the DCI format M_1 or the DCI format M_0, the MSB bits or all bits of one or more of specific DCI fields (e.g., a "Time domain resource assignment" field, a "Modulation and coding scheme 2" field, a "New data indicator 2" field, a "Redundancy version" field, a "CBG transmission information (CBGTI)" field, or a "CBG flushing out information (CBGFI)" field) in the DCI format 1_1, the DCI format 0_1, the DCI format 1_2, or the DCI format 0_2 may be truncated until the size of the DCI format 1_1, the DCI format 0_1, the DCI format 1_2, or the DCI format 0_2 is the same as the size of the DCI format M_1 or the DCI format M_0.

In some implementations, when the truncation of the FDRA field happens (e.g., to better utilize the configured PRBs within an active DL BWP), and when type 1 resource allocation is used for the active DL BWP, the type 1 resource allocation may be based on resource block groups. In other words, the starting VRB $RB_{start}$ indicated by an RIV may be interpreted as $RB_{start} \cdot K$ and the indicated contiguously allocated resource blocks $L_{RBS}$ may be interpreted as $L_{RBS} \cdot K$. K may be determined as the maximum value from the set $\{1, 2, 4, 8\}$ which satisfies $K \leq \lfloor N_{BWP}^{active}/N^{Ref} \rfloor$. Otherwise, K=1. $N_{BWP}^{active}$ may be the number of PRBs of the active DL BWP. In some implementations, $N^{Ref}$ may be a reference number of PRBs, which may be defined as the minimum number of PRBs that results in the length of the FDRA field equal to the length of the truncated FDRA field. For example, if the truncated FDRA field is with 9 bits, then $N^{Ref}$ may be equal to 23, since the minimum N that results in $\lceil \log_2(N(N+1)/2) \rceil = 9$ is N=23. In some other implementations, $N^{Ref}$ may be defined as the maximum number of PRBs that results in the length of the FDRA field equal to the length of the truncated FDRA field. In some other implementations, $N^{Ref}$ may be a configured value or may be a configured value selected from a set of values.

In some other implementations, when type 0 resource allocation is used for the active DL BWP, the type 0 resource allocation may be based on resource block groups each includes a second number of consecutive VRBs, denoted as P'. The second number of resource blocks may be different from a first number of consecutive VRBs, denoted as P, which is the number of (nominal) consecutive VRBs in an RBG that are used for the active BWP. Table 8 may be used for determining nominal RBG size P. P may be determined based on an RRC parameter (e.g., "rbg-Size" field) and the size of the active DL BWP as illustrated in Table 8.

TABLE 8

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

P' may be determined as the smallest number in Table 8 that satisfies $\lceil (N_{BWP}^{active} + (N_{BWP,start}^{active} \mod P'))/P' \rceil \leq L_{FDRA}$. $N_{BWP,start}^{active}$ may be the common resource block index of the starting RB of the active BWP and $L_{FDRA}$ may be the length of the truncated FDRA field. In some implementations, the UE may not expect the FDRA field of the DCI formats to be truncated when the type 0 resource allocation is used for the active DL BWP.

In some other implementations, to align the sizes of the DCI format 1_1, the DCI format 0_1, the DCI format 1_2, or the DCI format 0_2 with the size of the DCI format M_1 or with the size of the DCI format M_0 in a search space configured by the PDCCH-Config associated with the CFR, some of the configurations in PDSCH-Config(s), PDCCH-Config(s), or PUCCH-Config(s) of the active DL BWP and the active UL BWP may be replaced by the configurations in PDSCH-Config, the PDCCH-Config, or PUCCH-Config associated with the CFR when determining the length of the DCI fields of the DCI format 1_1, the DCI format 0_1, the DCI format 1_2, or the DCI format 0_2. For example, the length of the "Time domain resource assignment" field of the DCI format 1_1 may be determined by a "pdsch-TimeDomainAllocationList" field in the PDSCH-Config associated with the CFR.

DCI Format Ambiguity

DCI format ambiguity may occur when a DCI format M_0 and a DCI format M_1 have the same size. Since a UE may need to interpret the fields of a DCI format based on an assumption of the DCI format, the DCI format ambiguity should be avoided.

Implementations for differentiating a DCI format M_0 and a DCI format M_1 may be described as follows.

In some implementations, the MSB bit of a DCI format M_0 and a DCI format M_1 may be a "Identifier for DCI formats" field. Value of 0 may indicate that the DCI is the DCI format M_0. Value of 1 may indicate that the DCI is the DCI format M_1.

In some implementations, the UE may not (expect to) be configured with (both) the DCI format M_0 and the DCI format M_1 for a CFR.

In some implementations, the UE may not expect that the DCI format M_0 and the DCI format M_1 are of the same size in the CFR or in a cell.

In some implementations, the DCI format M_1 may be padded with one zero bit when the DCI format M_0 and the DCI format M_1 are of the same size in the CFR or in the cell.

In some implementations, the UE may not (expect to) be configured with (both) the DCI format M_0 and the DCI format M_1 for a search space configured in PDCCH-Config associated with the CFR.

In some implementations, one or more G-RNTIs may be configured to be associated with a search space. Each G-RNTI may be associated with a DCI format. The UE may determine the DCI format of a detected DCI by the G-RNTI that is used to scramble the CRC of the DCI. For example, the UE may be configured with a first G-RNTI and a second G-RNTI. Each G-RNTI may be associated with a particular MBS session. Since the UE may only be configured with either the DCI format M_0 or the DCI format M_1 to be applied for the MBS session, the UE may (be able to) determine the DCI format according to the G-RNTI applied for scrambling the CRC of the scheduling DCI.

To enable scheduling of group common PDSCH(s), CFR(s) may be configured. A CFR may be configured within an active DL BWP of a UE. Configuration of the CFR may be provided to the UE via SI or via dedicated signaling (e.g., RRC signaling). The configuration of the CFR may be provided together with associated configurations of PDCCH, PDSCH, and PUCCH for the CFR. For example, a CFR configuration (IE) may include at least one of PDCCH-Config, PDSCH-Config, or "PUCCH-ConfigurationList" (IE). It should be noted that the PDCCH-Config, the PDSCH-Config, and the PUCCH-ConfigurationList in the CFR configuration may be different from those in a dedicated BWP configuration of the UE.

A group common PDCCH transmitted within a CFR may be transmitted based on the configuration provided in the PDCCH-Config associated with the CFR. Similar to the PDCCH-Config for a DL BWP, the PDCCH-Config associated with the CFR may include configurations of CORESETs and search spaces associated with the CORESETs within the CFR. A group common PDSCH transmitted within a CFR may be transmitted based on the configuration provided in the PDSCH-Config associated with the CFR.

The group common PDCCH may be transmitted in a search space configured for a group of UEs. The search space may be a Type 3 CSS or a Type 4 CSS based on the configuration in PDCCH-Config associated with the CFR. The group common PDCCH may include a specific DCI format configured or defined for the group common PDCCH. For example, the DCI format may be a DCI format 1_0 with CRC scrambled by G-RNTI, a DCI format 1_1, or a DCI format 1_2 with CRC scrambled by G-RNTI. Alternatively, the DCI format may be a new DCI format (e.g., DCI format 1_3) with CRC scrambled by G-RNTI.

To receive a PDCCH or a PDSCH, a receive beam may (need to) be determined for receiving the PDCCH or the PDSCH. QCL information for the PDCCH or the PDSCH may be used to determine the receive beam. In Rel-15 NR, a TCI state may be used to provide the QCL information for receiving the PDCCH or the PDSCH. For example, a TCI state for receiving a PDCCH or a PDSCH may indicate that the PDCCH or the PDSCH is QCLed with a SSB or a CSI-RS. The UE may (then) receive the PDCCH or the PDSCH by using the receive beam that is used for receiving the SSB or the CSI-RS.

Configuration(s) of TCI state(s) for a PDCCH may be provided by at least one configuration/parameter (e.g., tci-StatesPDCCH-ToAddList and/or tci-StatesPDCCH-ToReleaseList) for a CORESET in which the PDCCH is transmitted. When more than one TCI state for the CORESET is provided by the at least one configuration (e.g., tci-StatesPDCCH-ToAddList and/or tci-StatesPDCCH-ToReleaseList), a MAC CE command may (need to) activate one TCI state from the TCI states provided by the at least one configuration (e.g., tci-StatesPDCCH-ToAddList and/or tci-StatesPDCCH-ToReleaseList).

When the UE receives a MAC CE activation command for one of the TCI states, the UE may apply the activation command in a first DL slot that is after UL slot $k+3N_{slot}^{subframe,\mu}$. For example, the first DL slot may be slot $k+3N_{slot}^{subframe,\mu}+1$ when the SCS of UL slots is equal to the SCS of DL slots. k may be the UL slot in which the UE may transmit a PUCCH with HARQ-ACK information for a PDSCH providing the activation command. μ may be an SCS configuration for the PUCCH. $N_{slot}^{subframe,\mu}$ may be a total number of slots per subframe for the SCS configuration μ. It should be noted that the configuration (e.g., tci-StatesPDCCH-ToAddList) may configure (e.g., include) a list of indices or IDs (e.g., indicated by "TCI-StateId") corresponding to a list of TCI states configured by a configuration (e.g., tci-StatesToAddModList) in PDSCH-Config for the same active DL BWP as the PDCCH-Config including the CORESET configuration.

Configuration(s) of TCI state(s) for a PDSCH may be provided by at least one configuration (e.g., tci-States-ToAddModList and/or tci-States-ToReleaseList) for a DL BWP in which the PDSCH is transmitted. A MAC CE activation command may be used to map up to 8 TCI states to codepoints of a DCI field (e.g., "Transmission Configuration Indication" field) in one DL BWP. When the UE receives the MAC CE activation command for mapping between the TCI states and the codepoints of the DCI field, the UE may apply the activation command in a first slot that is after slot $k+3N_{slot}^{subframe,\mu}$. k may be the slot in which the UE may transmit a PUCCH with HARQ-ACK information for a PDSCH providing the activation command. μ may be an SCS configuration for the PUCCH. $N_{slot}^{subframe,\mu}$ may be a total number of slots per subframe for the SCS configuration μ. The TCI state of the PDSCH may be determined based on the indicated codepoint in the DCI field (e.g., "Transmission Configuration Indication" field) of DCI scheduling the PDSCH.

In Rel-15 NR, for receiving a PDSCH, some of resource elements in the PDSCH may be used by a gNB for other purposes, which may be considered as not available by the UE when receiving the PDSCH. Configuring (or indicating) the resource elements not available for (receiving) the PDSCH has been discussed. "rateMatchPatternToAddModList" which indicates a list of rate match patterns may be included in PDSCH-Config associated with a DL BWP. Each rate match pattern of the list of rate match patterns may be indicated by "RateMatchPattern" included in the "rateMatchPatternToAddModList". When DCI scheduling the PDSCH is a DCI format 1_1 or a DCI format 1_2, the DCI may indicate which of the rate match patterns should be applied (e.g., which of the resource elements indicated by the rate match patterns should be considered as not available).

The UE may be configured with one or more ZP CSI-RS resource set configurations for aperiodic, semi-persistent, and periodic time-domain behaviors in a DL BWP. Each ZP CSI-RS resource set may include at most 16 ZP CSI-RS resources. The periodic ZP CSI-RS resource set may be configured by "p-ZP-CSI-RS-ResourceSet" in PDSCH-Config associated with the DL BWP. The semi-persistent ZP CSI-RS resource sets may be configured by "sp-ZP-CSI-RS-ResourceSetsToAddModList" in the PDSCH-Config associated with the DL BWP. The aperiodic ZP CSI-RS resource sets may be configured by "aperiodic-ZP-CSI-RS-ResourceSetsToAddModList" in the PDSCH-Config associated with the DL BWP. Resource elements indicated by the periodic ZP CSI-RS resource set may be considered as not available for (receiving) a PDSCH. Resource elements indicated by the semi-persistent ZP CSI-RS resource sets may be considered as not available for (receiving) the PDSCH when its triggering and activation is applied. Resource elements indicated by the aperiodic ZP CSI-RS resource sets may be considered as not available for (receiving) the PDSCH when its triggering and activation is applied.

For aperiodic ZP CSI-RS, the UE may be configured with a "ZP CSI-RS trigger" field in a DCI format 1_1 or DCI format 1_2 (for) triggering aperiodic ZP CSI-RS (e.g., an aperiodic ZP CSI-RS resource set including one or more ZP CSI-RS resources). Each non-zero codepoint of the "ZP CSI-RS trigger" field in the DCI format 1_1 may trigger one aperiodic ZP CSI-RS resource set (e.g., "ZP-CSI-RS-ResourceSet") in "aperiodic-ZP-CSI-RS-ResourceSetsToAddModList" by indicating corresponding aperiodic ZP CSI-RS resource set ID. A DCI codepoint '01' of the "ZP CSI-RS trigger" field may trigger the resource set with "ZP-CSI-RS-ResourceSetId" set to '1'. A DCI codepoint '10' of the "ZP CSI-RS trigger" field may trigger the resource set with "ZP-CSI-RS-ResourceSetId" set to '2'. A DCI codepoint '11' of the "ZP CSI-RS trigger" field may trigger the resource set with "ZP-CSI-RS-ResourceSetId" set to '3'. A DCI codepoint '00' of the "ZP CSI-RS trigger" field may be reserved for not (e.g., disabling) triggering aperiodic ZP CSI-RS. Each non-zero codepoint of the "ZP CSI-RS trigger" field in the DCI format 1_2 may trigger one aperiodic ZP CSI-RS resource set (e.g., "ZP-CSI-RS-ResourceSet") in "aperiodic-ZP-CSI-RS-ResourceSetsToAddModListDCI-1-2" by indicating corresponding aperiodic ZP CSI-RS resource set ID.

For semi-persistent ZP CSI-RS, when the UE transmits, in slot n, a PUCCH with HARQ-ACK information corresponding to a PDSCH carrying an activation command MAC CE for (activating) ZP CSI-RS resource(s), the UE's assumption on the PDSCH RE mapping corresponding to the activated ZP CSI-RS resource(s) may be applied starting from a first slot that is after slot $n+3N_{slot}^{subframe,\mu}$. μ may be an SCS configuration for the PUCCH. On the other hand, when the UE transmits, in slot n, the PUCCH with the HARQ-ACK information corresponding to the PDSCH carrying a deactivation command MAC CE for activated ZP CSI-RS resource(s), the UE's assumption on cessation of the PDSCH RE mapping corresponding to the deactivated ZP CSI-RS resource(s) may be applied starting from the first slot that is after slot $n+3N_{slot}^{subframe,\mu}$. μ may be the SCS configuration for the PUCCH.

PUCCH resource(s) for HARQ-ACK feedback for a group common PDSCH may be configured in "PUCCH-ConfigurationList" that is different from "PUCCH-ConfigurationList" that is used for configuration of PUCCH resource(s) for HARQ-ACK feedback for dedicated PDSCH, CSI, and SR. In other words, the UE may be configured with two "PUCCH-ConfigurationList", each may include up to two PUCCH-Config. The first PUCCH-Config in the "PUCCH-ConfigurationList" may include configuration(s) of PUCCH resources with lower physical layer priority. The second PUCCH-Config in the "PUCCH-ConfigurationList" may include configuration(s) of PUCCH resources with higher physical layer priority. The "PUCCH-ConfigurationList" for group common PDSCH may be configured as part of a CFR configuration or may be configured together with the other "PUCCH-ConfigurationList" that is used for dedicated PDSCH, CSI, and SR.

In the present disclosure, PUCCH resource(s) configured by "PUCCH-ConfigurationList" for group common PDSCH may be referred to as multicast PUCCH(s). PUCCH resource(s) configured by "PUCCH-ConfigurationList" for dedicated PDSCH, CSI, and SR may be referred to as unicast PUCCH(s). In addition, dedicated PDCCH(s) and dedicated PDSCH(s) may be referred to as unicast PDCCH(s) and unicast PDSCH(s), respectively.

Issues regarding multicast reception/transmission of PDCCH/PDSCH may be described as follows.

TCI State Indication for Group Common PDCCH and Group Common PDSCH

PDCCH-Config associated with a CFR and PDSCH-Config associated with the CFR may include TCI state configurations. Thus, whether configurations (or activation) of a TCI state for the group common PDCCH is based on the PDCCH-Config associated with the CFR or PDCCH-Config associated with an active DL BWP including the CFR may need to be defined. In addition, whether configurations (or activation) of the TCI state for the group common PDSCH is based on the PDSCH-Config associated with the CFR or PDSCH-Config associated with the active DL BWP including the CFR may need to be defined.

Implementations for handling TCI state indication(s) for group common PDCCH(s) and/or group common PDSCH(s) may be described as follows.

In some implementations, PDSCH-Config associated with a first DL BWP (e.g., in a first DL BWP configuration configuring the first DL BWP) may include at least one configuration (e.g., "tci-StatesToAddModList" field and/or "tci-StatesToReleaseList" field) configuring (or indicating) a list of TCI states.

In some implementations, PDSCH-Config associated with a CFR (e.g., in a CFR configuration configuring the CFR) may not include at least one first configuration (e.g., "tci-StatesToAddModList" field and/or "tci-StatesToReleaseList" field). Accordingly, signaling overhead may be reduced. Configurations for CORESETs configured by the PDCCH-Config associated with the CFR may include at least one second configuration (e.g., "tci-StatesPDCCH-ToAddList" field and/or "tci-StatesPDCCH-ToReleaseList" field). Each of the at least one second configuration may include a list of indices or IDs (e.g., indicated by "TCI-StateId") corresponding to TCI states configured by a configuration (e.g., "tci-StatesToAddModList" field) in the PDSCH-Config associated with the first DL BWP.

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one specific configuration ("BWP-DownlinkCommon" field and/or "BWP-DownlinkDedicated" field) including configuration(s) of the CFR.

In some other implementations, the first DL BWP may be determined as a DL BWP indicated by a specific configuration (e.g., "BWP-Id") included in the configuration(s) of the CFR.

In some other implementations, the first DL BWP may be determined as a DL BWP indicated by a specific configuration (e.g., "BWP-Id") included in CORESET configuration(s) for the CFR.

In some other implementations, the first DL BWP may be the current active DL BWP or the active DL BWP when the PDSCH-Config associated with the CFR is received.

In some implementations, an activation command MAC CE may be carried in a dedicated PDSCH or a group common PDSCH to indicate a TCI state applied for a CORESET. When the activation command MAC CE is carried in the group common PDSCH, a timing when the activation command should be applied may be aligned between a group of UEs receiving the group common PDSCH. A fixed timeline relative to the end of the group common PDSCH may be used to apply the activation command. A timeline relative to the end of a PUCCH transmission with HARQ-ACK corresponding to the group common PDSCH may not be used to apply the activation command, since the PUCCH transmission may be different for different UEs. For example, the fixed timeline may be defined as m+max {dl−DataToUL−ACK}+$3N_{slot}^{subframe,\mu}$. m may correspond to the UL slot that overlaps with the end of the group common PDSCH. max {dl−DataToUL−ACK} may be the maximum value configured in a specific configuration/parameter (e.g., "dl-DataToUL-ACK") in PUCCH-Config associated with the CFR. $N_{slot}^{subframe,\mu}$ may be a total number of slots per subframe for SCS configuration μ. For another example, the fixed timeline may be defined as m+$K_{1,max}$+$3N_{slot}^{subframe,\mu}$. m may correspond to the UL slot that overlaps with the end of the group common PDSCH. $K_{1,max}$ may be the maximum value configured in the specific configuration/parameter (e.g., "dl-DataToUL-ACK") in the PUCCH-Config associated with the CFR. $N_{slot}^{subframe,\mu}$ may be the total number of slots per subframe for SCS configuration μ. It should be noted that calculations of the fixed timeline under NTN and TN network may be different.

In some implementations, for an activation command carried in a group common PDSCH, a gNB may (need to) align IDs (e.g., indicated by "TCI-StateId") of TCI states included in an configuration (e.g., "tci-StatesPDCCH-ToAddList" field) of CORESET configurations for the CFR for a group of UEs. For example, when a UE is configured with a TCI state with an ID (e.g., indicated by "TCI-StateId") for unicast services and the UE determines to join a multicast service after other UEs have already joined the multicast service, the gNB may (need to) reconfigure the TCI states for the UE if the ID (e.g., indicated by "TCI-StateId") is included in the configuration (e.g., "tci-StatesPDCCH-ToAddList" field) of the CORESET configurations for the CFR for the other UEs. In some implementations, a field (e.g., "TCI State ID" field) in the activation command received in the group common PDSCH may be used to indicate the ordinal position of the indicated TCI state in the configuration (e.g., "tci-StatesPDCCH-ToAddList" field) for the CORESET indicated by the activation command. For example, when the field (e.g., "TCI State ID" field) in the activation command indicates 0, the first TCI state in the configuration (e.g., "tci-StatesPDCCH-ToAddList" field) for the CORESET indicated by the activation command may be activated. For another example, when the field (e.g., "TCI State ID" field) in the activation command indicates 1, the second TCI state in the configuration (e.g., "tci-StatesPDCCH-ToAddList" field) for the CORESET indicated by the activation command may be activated. The gNB may (need to) align the IDs (e.g., indicated by "controlResourceSetId") for the CORESETs configured for the CFR for the group of UEs. A value of x in a field (e.g., "CORESET ID" field) in the activation command may be used to indicate the CORESETs configured for the CFRs with (x+1)-th lowest ID (e.g., indicated by "controlResourceSetId") for the serving cell indicated by the activation command. Accordingly, configuration flexibility may be improved.

In some other implementations, the PDSCH-Config associated with the CFR may include at least one configuration (e.g., "tci-StatesToAddModList" field and/or "tci-StatesToReleaseList" field). Configurations for CORESETs configured by PDCCH-Config associated with the CFR may include at least one second configuration (e.g., "tci-StatesPDCCH-ToAddList" field and/or "tci-StatesPDCCH-ToReleaseList" field). Each of the at least one second configuration may include a list of indices or IDs (e.g., indicated by "TCI-StateId") corresponding to TCI states configured by a configuration (e.g., "tci-StatesToAddModList" field) in the PDSCH-Config associated with the CFR. The field (e.g., "TCI State ID" field) in the activation command MAC CE may indicate a TCI state, with an ID (e.g., indicated by "TCI-StateId") equal to a value of the field, configured by the configuration (e.g., "tci-StatesToAddModList" field) in the PDSCH-Config associated with the CFR when the field (e.g., "CORESET ID" field) of the activation command MAC CE indicates a CORESET configured by the PDCCH-Config associated with the CFR. The benefits of the implementations may include, but is not limited to, that configuration of the CFR is not affected by (re)configuration of a dedicated PDSCH or a dedicated PDCCH.

In some implementations, when the PDSCH-Config associated with the CFR does not include at least one configuration (e.g., "tci-StatesToAddModList" field and/or "tci-StatesToReleaseList" field), each of IDs (e.g., indicated by "TCI-StateId") included in the at least one configuration (e.g., "tci-StatesPDCCH-ToAddList" field and/or "tci-StatesPDCCH-ToReleaseList" field) in the CORESET configurations associated with the CFR may be an index corresponding to a TCI state configured by a configuration (e.g., "tci-StatesToAddModList" field) in PDSCH-Config of a first DL BWP.

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one configuration ("BWP-DownlinkCommon" field and/or "BWP-DownlinkDedicated" field) including configuration(s) of the CFR.

In some other implementations, the first DL BWP may be determined as a DL BWP indicated by a specific configuration (e.g., "BWP-Id") included in the configuration(s) of the CFR.

In some other implementations, the first DL BWP may be determined as a DL BWP indicated by a specific configuration (e.g., "BWP-Id") included in CORESET configuration(s) for the CFR.

In some other implementations, the first DL BWP may be the current active DL BWP or the active DL BWP when the PDSCH-Config associated with the CFR is received.

In some implementations, the ID (e.g., indicated by "TCI-StateId") of the TCI states configured in the at least one configuration (e.g., "tci-StatesToAddModList" field and/or "tci-StatesToReleaseList" field) in the PDSCH-Config associated with the CFR may not be the same as the ID (e.g., indicated by "TCI-StateId") of the TCI states configured in the at least one configuration (e.g., "tci-StatesToAddModList" field and/or "tci-StatesToReleaseList" field) in the PDSCH-Config associated with the first DL BWP.

Accordingly, the number of TCI states the UE is required to handle may be reduced. Configurations for CORESETs configured by the PDCCH-Config associated with the CFR may include the at least one configuration (e.g., "tci-StatesPDCCH-ToAddList" field and/or "tci-StatesPDCCH-ToReleaseList" field). Each of the at least one configuration may include a list of indices or IDs (e.g., indicated by "TCI-StateId") corresponding to the TCI states configured by the configuration (e.g., "tci-StatesToAddModList" field) in the PDSCH-Config associated with the CFR or corresponding to the TCI states configured by the configuration (e.g., "tci-StatesToAddModList" field) in the PDSCH-Config associated with the first DL BWP.

In some implementations, an activation command MAC CE may be carried in a dedicated PDSCH or a group common PDSCH to indicate a TCI state applied for a CORESET. When the activation command MAC CE is carried in the group common PDSCH, a timing when the activation command should be applied may be aligned between a group of UEs receiving the group common PDSCH. A fixed timeline relative to the end of the group common PDSCH may be used to apply the activation command. A timeline relative to the end of a PUCCH transmission with HARQ-ACK corresponding to the group common PDSCH may not be used to apply the activation command, since the PUCCH transmission may be different for different UEs. For example, the fixed timeline may be defined as m+max {dl−DataToUL−ACK}+$3N_{slot}^{subframe,\mu}$. m may correspond to the UL slot that overlaps with the end of the group common PDSCH. max{dl−DataToUL−ACK} may be the maximum value configured in a specific configuration/parameter (e.g., "dl-DataToUL-ACK") in PUCCH-Config associated with the CFR. $N_{slot}^{subframe,\mu}$ may be a total number of slots per subframe for SCS configuration μ. For another example, the fixed timeline may be defined as m+$K_{1,max}$+$3N_{slot}^{subframe,\mu}$. m may correspond to the UL slot that overlaps with the end of the group common PDSCH. $K_{1,max}$ may be the maximum value configured in the specific configuration/parameter (e.g., "dl-DataToUL-ACK") in the PUCCH-Config associated with the CFR. $N_{slot}^{subframe,\mu}$ may be the total number of slots per subframe for SCS configuration μ. It should be noted that calculations of the fixed timeline under NTN and TN network may be different.

In some implementations, for an activation command carried in a group common PDSCH, a gNB may (need to) align IDs (e.g., indicated by "TCI-StateId") of TCI states included in an configuration (e.g., "tci-StatesPDCCH-ToAddList" field) of CORESET configurations for the CFR for a group of UEs. For example, when a UE is configured with a TCI state with an ID (e.g., indicated by "TCI-StateId") for unicast services and the UE determines to join a multicast service after other UEs have already joined the multicast service, the gNB may (need to) reconfigure the TCI states for the UE if the ID (e.g., indicated by "TCI-StateId") is included in the configuration (e.g., "tci-StatesPDCCH-ToAddList" field) of the CORESET configurations for the CFR for the other UEs. In some implementations, a field (e.g., "TCI State ID" field) in the activation command received in the group common PDSCH may be used to indicate the ordinal position of the indicated TCI state in the configuration (e.g., "tci-StatesPDCCH-ToAddList" field) for the CORESET indicated by the activation command. For example, when the field (e.g., "TCI State ID" field) in the activation command indicates 0, the first TCI state in the configuration (e.g., "tci-StatesPDCCH-ToAddList" field) for the CORESET indicated by the activation command may be activated. For another example, when the field (e.g., "TCI State ID" field) in the activation command indicates 1, the second TCI state in the configuration (e.g., "tci-StatesPDCCH-ToAddList" field) for the CORESET indicated by the activation command may be activated. The gNB may (need to) align the IDs (e.g., indicated by "controlResourceSetId") for the CORESETs configured for the CFR for the group of UEs. A value of x in a field (e.g., "CORESET ID" field) in the activation command may be used to indicate the CORESETs configured for the CFRs with (x+1)-th lowest ID (e.g., indicated by "controlResourceSetId") for the serving cell indicated by the activation command. Accordingly, configuration flexibility may be improved.

In some implementations, PDSCH-Config associated with a CFR (e.g., in a CFR configuration configuring the CFR) may include at least one configuration (e.g., "tci-StatesToAddModList" field and/or "tci-StatesToReleaseList" field). An activation/deactivation command MAC CE may be used to map TCI states configured by the at least one configuration to codepoints of a first field (e.g., "Transmission Configuration Indication") in a DCI format used for scheduling a group common PDSCH in the CFR. A second field (e.g., "Ti") in the activation/deactivation command MAC CE may indicate an activation/deactivation status of a TCI state with an ID (e.g., indicated by "TCI-StateId"=T) if there is the TCI state with the ID (e.g., indicated by "TCI-StateId"='i') that is configured. Otherwise, a MAC entity of the UE may ignore the second field.

In some implementations, the activation/deactivation command MAC CE may be carried in a dedicated PDSCH or a group common PDSCH. To differentiate the activation/deactivation command MAC CE from a second activation/deactivation command MAC CE, a first LCID for the activation/deactivation command MAC CE may be different from a second LCID for the second activation/deactivation command MAC CE. The second activation/deactivation command MAC CE may be used for mapping TCI states configured by at least one configuration (e.g., "tci-StatesToAddModList" field and/or "tci-StatesToReleaseList" field) in the PDSCH-Config associated with a DL BWP to codepoints of a field (e.g., "Transmission Configuration Indication") in a DCI format used for scheduling a dedicated PDSCH (e.g., a legacy activation/deactivation command MAC CE).

In some implementations, a field (e.g., "CFR ID") may be included in the activation/deactivation command MAC CE to indicate a CFR to which the activation/deactivation command is applied. The length of the field may be 2 bits, 3 bits, or 4 bits. In some implementations, a legacy activation/deactivation command MAC CE may be transmitted in a group common PDSCH in a CFR to map TCI states configured by at least one configuration (e.g., "tci-StatesToAddModList" field and/or "tci-StatesToReleaseList" field) in the PDSCH-Config associated with the CFR to codepoints of a field (e.g., "Transmission Configuration Indication") in a DCI format used for scheduling the group common PDSCH in the CFR. In other words, the interpretation of the MAC CE received in a group common PDSCH may be different from the interpretation of the MAC CE received in a dedicated PDSCH. A field (e.g., "BWP ID") in the activation/deactivation command MAC CE may be ignored by the UE. In some implementations, a legacy activation/deactivation command MAC CE may be transmitted in a dedicated PDSCH in a CFR to map TCI states configured by at least one configuration (e.g., "tci-StatesToAddModList" field and/or "tci-StatesToReleaseList" field) in the PDSCH-Config associated with the CFR to codepoints of a field (e.g., "Transmission Configuration Indication") in a DCI format used for scheduling a group common PDSCH in the CFR. In other words, the interpretation of the MAC CE received in a dedicated PDSCH within a CFR may be different from the interpretation of the MAC CE received in a dedicated PDSCH outside a CFR. A field (e.g., "BWP ID") in the activation/deactivation command MAC CE may be ignored by the UE.

In some implementations, when the PDSCH-Config associated with the CFR does not include the at least one configuration (e.g., "tci-StatesToAddModList" field and/or "tci-StatesToReleaseList" field), the second field (e.g., "Ti") in the activation/deactivation command MAC CE may indicate the activation/deactivation status of the TCI state with the ID (e.g., indicated by "TCI-StateId"=T) if there is the TCI state with the ID (e.g., indicated by "TCI-StateId"='i') that is configured in PDSCH-Config of a first DL BWP.

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one specific configuration ("BWP-DownlinkCommon" field and/or "BWP-DownlinkDedicated" field) including configuration(s) of the CFR.

In some other implementations, the first DL BWP may be determined as a DL BWP indicated by a specific configuration (e.g., "BWP-Id") included in the configuration(s) of the CFR.

In some other implementations, the first DL BWP may be determined as a DL BWP indicated by a specific configuration (e.g., "BWP-Id") included in the PDSCH-Config associated with the CFR.

In some implementations, the ID (e.g., indicated by "TCI-StateId") of the TCI states configured in the at least one configuration (e.g., "tci-StatesToAddModList" field and/or "tci-StatesToReleaseList" field) in the PDSCH-Config associated with the CFR may not be the same as the ID (e.g., indicated by "TCI-StateId") of the TCI states configured in the at least one configuration (e.g., "tci-StatesToAddModList" field and/or "tci-StatesToReleaseList" field) in the PDSCH-Config associated with the first DL BWP. Accordingly, the number of TCI states the UE is required to handle may be reduced. In some implementations, the second field ("Ti") in the activation/deactivation command MAC CE may indicate the activation/deactivation status of the TCI state with the ID (e.g., indicated by "TCI-StateId"=T) if there is the TCI state with the ID (e.g., indicated by "TCI-StateId"=T) that is configured in the PDSCH-Config associated with the CFR or in the PDSCH-Config of the first DL BWP.

Rate Match Pattern Indication for Group Common PDSCH

PDSCH-Config associated with a CFR may include rate match pattern configuration(s). Thus, whether configuration(s) (or indication(s)) of a rate match pattern for a group common PDSCH is based on the PDSCH-Config for the CFR or PDSCH-Config for an active DL BWP including the CFR may need to be defined.

Implementations for handling rate match pattern indication(s) for group common PDSCH(s) may be described as follows.

In some implementations, PDSCH-Config associated with a first DL BWP (e.g., in a first DL BWP configuration configuring the first DL BWP) may include at least one configuration (e.g., "rateMatchPatternToAddModList" field) configuring (or indicating) a list of rate match patterns.

In some implementations, PDSCH-Config associated with a CFR (e.g., in a CFR configuration configuring the CFR) may not include at least one configuration (e.g., "rateMatchPatternToAddModList" field and/or "rateMatchPatternToReleaseList" field) configuring (or indicating) a list of rate match patterns. Accordingly, signaling overhead may be reduced. In some implementations, the PDSCH-Config associated with the CFR may include at least one configuration. The at least one configuration may include, but is not limited to, "rateMatchPatternGroup1" field and/or "rateMatchPatternGroup2" field. Each of the at least one configuration may configure (or indicate) a list of indices or IDs (e.g., indicated by "RateMatchPatternId") corresponding to the rate match patterns configured by the PDSCH-Config associated with the first DL BWP, when the IDs (e.g., indicated by "RateMatchPatternId") are indicated by a first configuration (e.g., "bwpLevel"). Each ID may be indicated by a second configuration (e.g., "cellLevel" or "bwpLevel").

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one configuration (e.g., "BWP-DownlinkCommon" field and/or "BWP-DownlinkDedicated" field) including configuration(s) of the CFR.

In some other implementations, the first DL BWP may be determined as a DL BWP indicated by a configuration (e.g., "BWP-Id") included in the configuration(s) of the CFR.

In some other implementations, the first DL BWP may be determined as a DL BWP indicated by a configuration (e.g., "BWP-Id") included in the PDSCH-Config associated with the CFR. In some other implementations, the configuration (e.g., "BWP-Id") may be at least one configuration (e.g., "rateMatchPatternGroup1" field and/or "rateMatchPatternGroup2" field) included in the PDSCH-Config associated with the CFR.

In some implementations, a rate match pattern group may be dynamically configured by at least one configuration (e.g., "rateMatchPatternGroup1" field and/or "rateMatchPatternGroup2" field) in the PDSCH-Config associated with the CFR. The rate match pattern group may include (a list of) indices of rate match patterns forming a union of resource sets not available for a group common PDSCH in the CFR if a corresponding bit of a field (e.g., "Rate matching indicator") of a DCI format scheduling the group common PDSCH in the CFR is equal to 1.

In some other implementations, the PDSCH-Config associated with the CFR (e.g., in the CFR configuration configuring the CFR) may include the at least one configuration (e.g., "rateMatchPatternToAddModList" field and/or "rateMatchPatternToReleaseList" field) configuring (or indicating) a list of rate match patterns. In some implementations, the PDSCH-Config associated with the CFR may include at least one configuration. The at least one configuration may include, but is not limited to, "rateMatchPatternGroup1" field and/or "rateMatchPatternGroup2" field. Each of the at least one configuration may configure (or indicate) (a list of) indices or IDs (e.g., indicated by "RateMatchPatternId") corresponding to the rate match patterns configured by the PDSCH-Config associated with the first DL BWP, when the IDs (e.g., indicated by "RateMatchPatternId") are indicated by a first configuration (e.g., "bwpLevel"). Each ID may be indicated by a second configuration (e.g., "cellLevel" or "bwpLevel"). The benefits of the implementations may include, but is not limited to, that a CORESET configured for the CFR may not be configured as a rate match pattern in the configuration (e.g., "rateMatchPatternToAddModList" field) in the PDSCH-Config of a DL BWP, or that configuration of the CFR is not affected by (re)configuration of a dedicated PDSCH.

In some implementations, the PDSCH-Config associated with the CFR may include at least one configuration (e.g., "rateMatchPatternToAddList" field and/or "rateMatchPatternToReleaseList" field). Each of the at least one configuration may include a list of indices or IDs (e.g., indicated by "RateMatchPatternId") corresponding to the rate match patterns configured by the configuration (e.g., "rateMatchPatternToAddModList") in the PDSCH-Config associated with the first DL BWP.

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one configuration (e.g., "BWP-DownlinkCommon" field and/or "BWP-DownlinkDedicated" field) including configuration(s) of the CFR.

In some other implementations, the first DL BWP may be determined as a DL BWP indicated by a configuration (e.g., "BWP-Id") included in the configuration(s) of the CFR.

In some other implementations, the first DL BWP may be determined as a DL BWP indicated by a configuration (e.g., "BWP-Id") included in the PDSCH-Config associated with the CFR. In some other implementations, the configuration (e.g., "BWP-Id") may be at least one configuration (e.g., "rateMatchPatternGroup1" field and/or "rateMatchPatternGroup2" field) included in the PDSCH-Config associated with the CFR.

In some implementations, for a rate match pattern configured by at least one configuration (e.g., "rateMatchPatternToAddModList" field and/or "rateMatchPatternToReleaseList" field) in the PDSCH-Config associated with the CFR, when the rate match pattern is configured by a configuration (e.g., "controlResourceSet" field) indicating a CORESET configured for the CFR, resource elements that are not available for a group common PDSCH in the CFR may be determined by monitoring occasions of search spaces configured for the CFR that are associated with the CORESET. In some implementations, resource elements determined by monitoring occasions of search spaces not configured for the CFR that are associated with the CORESET may not be considered as not available for the group common PDSCH in the CFR.

In some implementations, for a rate match pattern configured in a first configuration (e.g., "rateMatchPatternToAddModList" field) in the PDSCH-Config associated with the CFR, a resource block level bitmap configured by a second configuration (e.g., "resourceBlocks") may be used to indicate the rate match pattern in frequency domain. A symbol level bitmap configured by a third configuration (e.g., "symbolsInResourceBlock") may be used to indicate the symbols to which the rate match pattern configured by the second configuration (e.g., "resourceBlocks") is applied. The bitmap configured by the second configuration (e.g., "resourceBlocks") may identify PRBs within the CFR. The first/leftmost bit may correspond to the PRB with the lowest PRB index in the CFR.

In some implementations, each of at least one configuration (e.g., "rateMatchPatternGroup1" field and/or "rateMatchPatternGroup2" field) may configure (or indicate) (a list of) indices or IDs (e.g., indicated by "RateMatchPatternId") corresponding to the rate match patterns configured by a configuration (e.g., "rateMatchPatternToAddModList") in the PDSCH-Config associated with the CFR when the IDs (e.g., indicated by "RateMatchPatternId") are indicated by a first configuration (e.g., "cfrLevel"). Each ID may be indicated by a second configuration (e.g., "cellLevel" or "cfrLevel"). The at least one configuration may indicate "RateMatchPatternGroup" as illustrated in Table 9.

TABLE 9

```
RateMatchPatternGroup ::=           SEQUENCE (SIZE
(1..maxNrofRateMatchPatternsPerGroup)) OF CHOICE {
  cellLevel                         RateMatchPatternId,
  cfrLevel                          RateMatchPatternId
}
```

In some implementations, each of at least one configuration (e.g., "rateMatchPatternGroup1" field and/or "rateMatchPatternGroup2" field) may configure (or indicate) (a list of) indices or IDs (e.g., indicated by "RateMatchPatternId") corresponding to the rate match patterns configured by a configuration (e.g., "rateMatchPatternToAddModList" field) in the PDSCH-Config associated with the first DL BWP when the IDs (e.g., indicated by "RateMatchPatternId") are indicated by a first configuration (e.g., "bwpLevel"). Each ID may be indicated by a second configuration (e.g., "cellLevel", "bwpLevel", or "cfrLevel").

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one configuration (e.g., "BWP-DownlinkCommon" field and/or "BWP-DownlinkDedicated" field) including configuration(s) of the CFR.

In some other implementations, the first DL BWP may be determined as a DL BWP indicated by a configuration (e.g., "BWP-Id") included in the configuration(s) of the CFR.

In some other implementations, the first DL BWP may be determined as a DL BWP indicated by a configuration (e.g., "BWP-Id") included in the PDSCH-Config associated with the CFR. In some other implementations, the configuration (e.g., "BWP-Id" IE) may be at least one configuration (e.g., "rateMatchPatternGroup1" field and/or "rateMatchPatternGroup2" field) included in the PDSCH-Config associated with the CFR.

The at least one configuration may indicate "RateMatchPatternGroup" as illustrated in Table 10.

TABLE 10

```
RateMatchPatternGroup ::=           SEQUENCE (SIZE
(1..maxNrofRateMatchPatternsPerGroup)) OF CHOICE {
  cellLevel                         RateMatchPatternId,
  bwpLevel                          RateMatchPatternId,
  cfrLevel                          RateMatchPatternId
}
```

In some implementations, the IDs (e.g., indicated by "RateMatchPatternId") of the rate match patterns configured in the at least one configuration (e.g., "rateMatchPatternToAddModList" field and/or "rateMatchPatternToReleaseList" field) in the PDSCH-Config associated with the CFR may not be the same as the IDs (e.g., indicated by "RateMatchPatternId") of the rate match patterns configured in the at least one configuration (e.g., "rateMatchPatternToAddModList" field and/or "rateMatchPatternToReleaseList" field) in the PDSCH-Config associated with the first DL BWP. Accordingly, the number of rate match patterns the UE is required to handle may be reduced. In some implementations, each of the at least one configuration (e.g., "rateMatchPatternGroup1" field and/or "rateMatchPatternGroup2" field) may include (a list of) indices corresponding to the rate match patterns configured by the configuration (e.g., "rateMatchPatternToAddModList" field) in the PDSCH-Config associated with the CFR or corresponding to the rate match patterns configured by the configuration (e.g., "rateMatchPatternToAddModList" field) in the PDSCH-Config associated with the first DL BWP, when the ID (e.g., indicated by "RateMatchPatternId") is indicated by a first configuration (e.g., "bwpLevel"). Each ID may be indicated by a second configuration (e.g., "cellLevel" or "bwpLevel").

In some implementations, a rate match pattern group may be dynamically configured by at least one configuration (e.g., "rateMatchPatternGroup1" field and/or "rateMatchPatternGroup2" field) in the PDSCH-Config associated with the CFR. The rate match pattern group may include (a list of) indices of rate match patterns forming a union of resource sets not available for a group common PDSCH in the CFR if a corresponding bit of a field (e.g., "Rate matching indicator") of a DCI format scheduling the group common PDSCH in the CFR is equal to 1.

ZP CSI-RS Indication for Group Common PDSCH

PDSCH-Config associated with a CFR may include ZP CSI-RS configuration(s). Thus, whether configuration(s) (or indication(s)) of a ZP CSI-RS for a group common PDSCH is based on the PDSCH-Config for the CFR or PDSCH-Config for an active DL BWP including the CFR may need to be defined.

Implementations for handling ZP CSI-RS indication(s) for group common PDSCH(s) may be described as follows.

In some implementations, PDSCH-Config associated with a first DL BWP (e.g., in a first DL BWP configuration configuring the first DL BWP) may include at least one specific configuration (e.g., "zp-CSI-RS-ResourceToAddModList" field) configuring (or indicating) a list of ZP CSI-RS resources.

In some implementations, PDSCH-Config associated with a CFR (e.g., in a CFR configuration configuring the CFR) may not include at least one specific configuration (e.g., "zp-CSI-RS-ResourceToAddModList" field and/or "zp-CSI-RS-ResourceToReleaseList" field) configuring (or indicating) a list of ZP CSI-RS resources. Accordingly, signaling overhead may be reduced. In some implementations, the PDSCH-Config associated with the CFR may include at least one configuration. The at least one configuration may include, but is not limited to, "aperiodic-ZP-CSI-RS-ResourceSetsToAddModList" field, "aperiodic-ZP-CSI-RS-ResourceSetsToReleaseList" field, "sp-ZP-CSI-RS-ResourceSetsToAddModList" field, or "sp-ZP-CSI-RS-ResourceSetsToReleaseList" field. Each of the at least one configuration may configure (or indicate) a list of ZP CSI-RS resource sets. The list of ZP CSI-RS resource sets configured by each of the at least one configuration may be a list of aperiodic or semi-persistent ZP CSI-RS resource sets that are configured or (configured to be) released. ZP CSI-RS resources in each of the list of ZP CSI-RS resource sets may be indicated (or identified) by a list of indices or IDs (e.g., indicated by "ZP-CSI-RS-ResourceId") corresponding to the ZP CSI-RS resources configured by the specific configuration (e.g., "zp-CSI-RS-ResourceToAddModList" field) in the PDSCH-Config associated with the first DL BWP.

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one configuration (e.g., "BWP-DownlinkCommon" field and/or "BWP-DownlinkDedicated" field) including configuration(s) of the CFR.

In some other implementations, the first DL BWP may be determined as a DL BWP indicated by a specific configuration (e.g., "BWP-Id") included in the configuration(s) of the CFR.

In some other implementations, the first DL BWP may be determined as a DL BWP indicated by a specific configuration (e.g., "BWP-Id") included in the PDSCH-Config associated with the CFR.

In some other implementations, the PDSCH-Config associated with the CFR (e.g., in the CFR configuration configuring the CFR) may include the at least one specific configuration (e.g., "zp-CSI-RS-ResourceToAddModList" field and/or "zp-CSI-RS-ResourceToReleaseList" field) configuring (or indicating) a list of ZP CSI-RS resources. In some implementations, the PDSCH-Config associated with the CFR may include at least one configuration. The at least one configuration may include, but is not limited to, "aperiodic-ZP-CSI-RS-ResourceSetsToAddModList" field, "aperiodic-ZP-CSI-RS-ResourceSetsToReleaseList" field, "sp-ZP-CSI-RS-ResourceSetsToAddModList" field, or "sp-ZP-CSI-RS-ResourceSetsToReleaseList" field. Each of the at least one configuration may configure (or indicate) a list of ZP CSI-RS resource sets. The list of ZP CSI-RS resource sets configured by each of the at least one configuration may be a list of aperiodic or semi-persistent ZP CSI-RS resource sets that is configured or (configured to be) released. ZP CSI-RS resources in each of the list of ZP CSI-RS resource sets may be indicated (or identified) by a list of indices or IDs (e.g., indicated by "ZP-CSI-RS-ResourceId") corresponding to the ZP CSI-RS resources configured by the specific configuration (e.g., "zp-CSI-RS-ResourceToAddModList" field) in the PDSCH-Config associated with the CFR.

In some implementations, the IDs (e.g., indicated by "ZP-CSI-RS-ResourceId") of the ZP CSI-RS resources configured in the at least one specific configuration (e.g., "zp-CSI-RS-ResourceToAddModList" and/or "zp-CSI-RS-ResourceToReleaseList" field) in the PDSCH-Config associated with the CFR may not be the same as the IDs (e.g., indicated by "ZP-CSI-RS-ResourceId") of the ZP CSI-RS resources configured in the at least one specific configuration (e.g., "zp-CSI-RS-ResourceToAddModList" field and/or "zp-CSI-RS-ResourceToReleaseList" field) in the PDSCH-Config associated with the first DL BWP. Accordingly, the number of ZP CSI-RS resources the UE is required to handle may be reduced. In some implementations, the PDSCH-Config associated with the CFR may include at least one configuration. The at least one configuration may include, but is not limited to, "aperiodic-ZP-CSI-RS-ResourceSetsToAddModList" field, "aperiodic-ZP-CSI-RS-ResourceSetsToReleaseList" field, "sp-ZP-CSI-RS-ResourceSetsToAddModList" field, or "sp-ZP-CSI-RS-ResourceSetsToReleaseList" field. Each of the at least one configuration may configure (or indicate) a list of ZP CSI-RS resource sets. The list of ZP CSI-RS resource sets configured by each of the at least one configuration may be a list of aperiodic or semi-persistent ZP CSI-RS resource sets that is configured or (configured to be) released. ZP CSI-RS resources in each of the list of ZP CSI-RS resource sets may be indicated (or identified) by a list of indices or IDs (e.g., indicated by "ZP-CSI-RS-ResourceId") corresponding to the ZP CSI-RS resources configured by the specific configuration (e.g., "zp-CSI-RS-ResourceToAddModList" field) in the PDSCH-Config associated with the first DL BWP or corresponding to the ZP CSI-RS resources configured by the specific configuration (e.g., "zp-CSI-RS-ResourceToAddModList" field) in the PDSCH-Config associated with the CFR.

In some implementations, DCI (e.g., a DCI format) used for scheduling a group common PDSCH in the CFR may be configured with (e.g., include) a DCI field for triggering aperiodic ZP CSI-RS (e.g., an aperiodic ZP CSI-RS resource set including one or more ZP CSI-RS resources). The DCI format may be a DCI format 1_0 with CRC scrambled by G-RNTI, a DCI format 1_1, or a DCI format 1_2 with CRC scrambled by G-RNTI. In some other implementations, the DCI format may be a new DCI format with CRC scrambled by G-RNTI. The DCI field for triggering the aperiodic ZP CSI-RS resource set may be a "ZP CSI-RS trigger" field. Each non-zero codepoint of the DCI field in the DCI format may trigger, by indicating an ID of one of the list of ZP CSI-RS resource sets, the one of the list of ZP CSI-RS resource sets (e.g., aperiodic "ZP-CSI-RS-ResourceSet" in the list "aperiodic-ZP-CSI-RS-ResourceSetsToAddModList") configured by the PDSCH-Config associated with the CFR. For example, DCI codepoint '01' of the DCI field may trigger a resource set with "ZP-CSI-RS-ResourceSetId" set to '1', DCI codepoint '10' of the DCI field may trigger a resource set with "ZP-CSI-RS-ResourceSetId" set to '2', and DCI codepoint '11' of the DCI field may trigger a resource set with "ZP-CSI-RS-ResourceSetId" set to '3'. DCI codepoint '00' of the DCI field may be reserved for disabling (e.g., not) triggering any aperiodic ZP CSI-RS. When an aperiodic ZP CSI-RS resource set is triggered by a DCI, the resource elements of the one or more ZP CSI-RS resources included in the indicated aperiodic ZP CSI-RS resource set may not be available for receiving the group common PDSCH scheduled by the DCI. The maximum number of configured resource set (s) (e.g., aperiodic ZP-CSI-RS-ResourceSet(s) configured per BWP) may be 3.

In some implementations, a first activation/deactivation command MAC CE (e.g., a legacy activation/deactivation command MAC CE) used for activating or deactivating a first semi-persistent ZP CSI-RS resource set may be carried in a dedicated PDSCH or in a group common PDSCH in the CFR. The first semi-persistent ZP CSI-RS resource set may be (considered as) not available for receiving the dedicated PDSCH in the CFR. In some implementations, a second activation/deactivation command MAC CE used for activating or deactivating a second semi-persistent ZP CSI-RS resource set may be carried in a dedicated PDSCH or in a group common PDSCH in the CFR. The second semi-persistent ZP CSI-RS resource set may be (considered as) not available for receiving the group common PDSCH in the CFR. In some implementations, when the first activation/deactivation command MAC CE is carried in the dedicated PDSCH, to differentiate the first activation/deactivation command MAC CE from the second activation/deactivation command MAC CE, a first LCID for the first activation/deactivation command MAC CE may be different from a second LCID for the second activation/deactivation command MAC CE.

In some implementations, when a new activation/deactivation command MAC CE with a different LCID (e.g., different from the first LCD) is carried in the dedicated PDSCH, the CFR to which the new activation/deactivation command should be applied may be determined (implicitly) as the CFR included within the DL BWP in which the dedicated PDSCH is received. Accordingly, a specific field (e.g., "BWP ID") of the new activation/deactivation command MAC CE may be ignored. In some other implementations, the CFR to which the new activation/deactivation command should be applied may be determined (implicitly) as the CFR included within the DL BWP indicated by the specific field (e.g., "BWP ID") of the new activation/deactivation command MAC CE. In some other implementations, the CFR to which the new activation/deactivation command should be applied may be determined (explicitly) by the specific field (e.g., "BWP ID") of the new activation/deactivation command MAC CE. For example, a value of the "BWP ID" field may indicate a "CFR ID" of the CFR. In some implementations, the "CFR ID" field may be defined in the new activation/deactivation command MAC CE which is used to (explicitly) indicate the CFR to which the new activation/deactivation command should be applied.

In some implementations, when the new activation/deactivation command MAC CE with a different LCID (e.g., different from the first LCD) is carried in the group common PDSCH, the CFR to which the new activation/deactivation command should be applied may be determined (implicitly) as the CFR included within the DL BWP in which the group common PDSCH is received. Accordingly, a specific field (e.g., "BWP ID") of the new activation/deactivation command MAC CE may be ignored. In some other implementations, the CFR to which the new activation/deactivation command should be applied may be determined (implicitly) as the CFR included within the DL BWP indicated by the specific field (e.g., "BWP ID") of the new activation/deactivation command MAC CE. In some other implementations, the CFR to which the new activation/deactivation command should be applied may be determined (explicitly) by the specific field (e.g., "BWP ID") of the new activation/deactivation command MAC CE. For example, a value of the "BWP ID" field may indicate a "CFR ID" of the CFR. In some implementations, the "CFR ID" field may be defined in the new activation/deactivation command MAC CE which is used to (explicitly) indicate the CFR to which the new activation/deactivation command should be applied.

In some implementations, when the activation/deactivation command MAC CE is carried in the group common PDSCH, the CFR to which the activation/deactivation command should be applied may be determined (implicitly) as the CFR in which the group common PDSCH is received. Accordingly, a specific field (e.g., "BWP ID") of the new activation/deactivation command MAC CE may be ignored.

In some implementations, when the activation command MAC CE is carried in the group common PDSCH, a timing when the activation command should be applied may be aligned between a group of UEs receiving the group common PDSCH. A fixed timeline relative to the end of the group common PDSCH may be used to apply the activation command. A timeline relative to the end of a PUCCH transmission with HARQ-ACK corresponding to the group common PDSCH may not be used to apply the activation command, since the PUCCH transmission may be different for different UEs. For example, the fixed timeline may be defined as $m+\max\{\text{dl–DataToUL–ACK}\}+3N_{slot}^{subframe,\mu}$. m may correspond to the UL slot that overlaps with the end of the group common PDSCH. $\max\{\text{dl–DataToUL–ACK}\}$ may be the maximum value configured in a specific configuration/parameter (e.g., "dl-DataToUL-ACK") in PUCCH-Config associated with the CFR. $N_{slot}^{subframe,\mu}$ may be a total number of slots per subframe for SCS configuration $\mu$. For another example, the fixed timeline may be defined as $m+K_{1,max}+3N_{slot}^{subframe,\mu}$. m may correspond to the UL slot that overlaps with the end of the group common PDSCH. $K_{1,max}$ may be the maximum value configured in the specific configuration/parameter (e.g., "dl-DataToUL-ACK") in the PUCCH-Config associated with the CFR. $N_{slot}^{subframe,\mu}$ may be the total number of slots per subframe for SCS configuration $\mu$.

In some implementations, PDSCH-Config associated with a CFR may include at least one specific configuration (e.g., "zp-CSI-RS-ResourceToAddModList" field and/or "zp-CSI-RS-ResourceToReleaseList" field). The PDSCH-Config associated with the CFR may include a configuration (e.g., "p-ZP-CSI-RS-ResourceSet" field) configuring periodic ZP CSI-RS resources. The periodic ZP CSI-RS resources may be indicated (or identified) by a list of indices or IDs (e.g., indicated by "ZP-CSI-RS-ResourceId") corresponding to the ZP CSI-RS resources configured by the at least one specific configuration (e.g., "zp-CSI-RS-ResourceToAddModList" field) in the PDSCH-Config associated with the CFR.

In some implementations, the periodic ZP CSI-RS resources configured by the configuration in the PDSCH-Config associated with the CFR may be (considered as) not available for receiving a group common PDSCH in the CFR. When the configuration is not configured, the ZP CSI-RS resources configured by the configuration in the PDSCH-Config associated with a first DL BWP may be (considered as) not available for receiving the group common PDSCH in the CFR.

In some implementations, the first DL BWP may be determined as a DL BWP including the CFR. In some implementations, when more than one DL BWP includes the CFR, the first DL BWP may be determined as an active DL BWP. In some other implementations, when more than one DL BWP includes the CFR, the first DL BWP may be determined as the DL BWP with the same numerology of the CFR.

In some other implementations, the first DL BWP may be determined as a DL BWP with at least one specific configuration ("BWP-DownlinkCommon" field and/or "BWP-DownlinkDedicated" field) including configuration(s) of the CFR.

In some other implementations, the first DL BWP may be determined as a DL BWP indicated by a specific configuration (e.g., "BWP-Id") included in the configuration(s) of the CFR.

In some other implementations, the first DL BWP may be determined as a DL BWP indicated by a specific configuration (e.g., "BWP-Id") included in the PDSCH-Config associated with the CFR.

In some implementations, the gNB may not configure the configuration (e.g., "p-ZP-CSI-RS-ResourceSet" field) in the PDSCH-Config associated with the CFR if the configuration in the PDSCH-Config associated with the first DL BWP is configured.

FIG. 1 is a flowchart illustrating a method 100 performed by a UE for handling PDSCH reception according to an example implementation of the present disclosure. In action 102, the UE may receive, from a BS, a first PDSCH configuration in a CFR configuration for multicast PDSCH (e.g., "CFR-ConfigMulticast(-r17)"). The first PDSCH configuration may include a first aperiodic resource set configuration (e.g., "aperiodic-ZP-CSI-RS-ResourceSetsToAddModList"). In action 104, the UE may receive, from the BS, a second PDSCH configuration in a BWP configuration for unicast PDSCH. The second PDSCH configuration may include a resource configuration (e.g., "zp-CSI-RS-ResourceToAddModList") and a second aperiodic resource set configuration. The resource configuration may configure one or more ZP CSI-RS resources. In action 106, the UE may receive, from the BS, first DCI scheduling a multicast PDSCH. The first DCI may include a first field for triggering aperiodic ZP CSI-RS. In action 108, the UE may determine, based on the first field, a first ZP CSI-RS resource set from a first list of ZP CSI-RS resource sets configured by the first aperiodic resource set configuration. The first ZP CSI-RS resource set is not available for reception of the multicast PDSCH. The resource configuration may be absent in the first PDSCH configuration. Each of the first list of ZP CSI-RS resource sets may include at least one of the one or more ZP CSI-RS resources.

FIG. 2 is a flowchart illustrating a method 200 performed by a UE (e.g., the UE performing the method 100 in FIG. 1) for handling PDSCH reception according to an example implementation of the present disclosure. In action 202, the UE may receive, from the BS, second DCI scheduling a unicast PDSCH. The second DCI may include a second field for triggering aperiodic ZP CSI-RS. In action 204, the UE may determine, based on the second field, a second ZP CSI-RS resource set from a second list of ZP CSI-RS resource sets configured by the second aperiodic resource set configuration. The second ZP CSI-RS resource set is not available for reception of the unicast PDSCH. Each of the second list of ZP CSI-RS resource sets may include at least one of the one or more ZP CSI-RS resources.

In some implementations, the second field of the second DCI may indicate a resource set ID of the second ZP CSI-RS resource set.

In some implementations, the CFR configuration may be included in the BWP configuration.

In some implementations, the first field of the first DCI may indicate a resource set ID of the first ZP CSI-RS resource set.

In some implementations, each of the one or more ZP CSI-RS resources may be associated with a resource ID. The at least one of the one or more ZP CSI-RS resources included in each of the first list of ZP CSI-RS resource sets may be indicated by a list of resource IDs configured by the first aperiodic resource set configuration. The list of resource IDs may be associated with the at least one of the one or more ZP CSI-RS resources.

Figure 3:
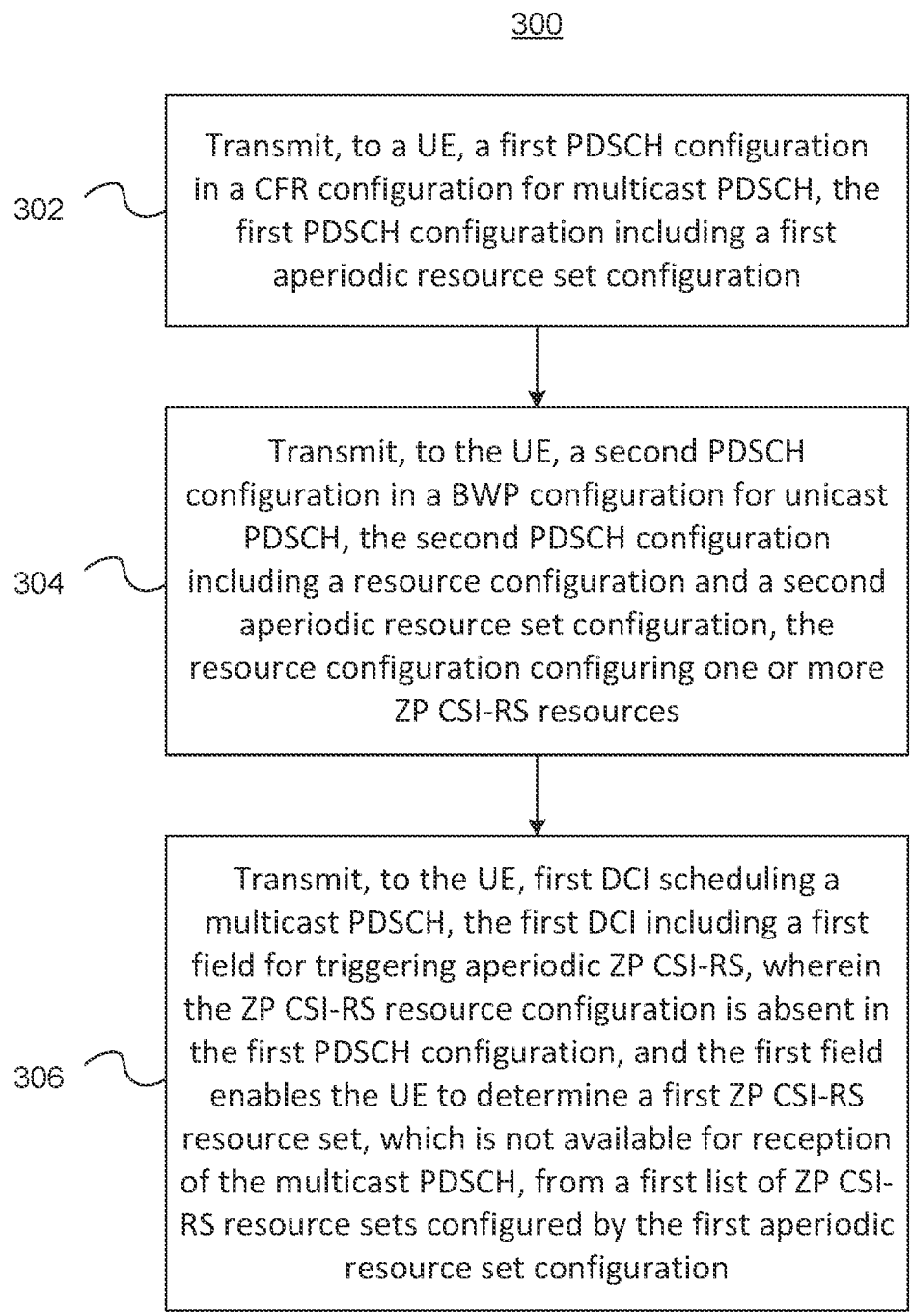
FIG. 3 is a flowchart illustrating a method performed by a BS for handling PDSCH transmission, according to an example implementation of the present disclosure.

FIG. 3 is a flowchart illustrating a method 300 performed by a BS for handling PDSCH transmission according to an example implementation of the present disclosure. In action 302, the BS may transmit, to a UE, a first PDSCH configuration in a CFR configuration for multicast PDSCH (e.g., "CFR-ConfigMulticast(-r17)"). The first PDSCH configuration may include a first aperiodic resource set configuration (e.g., "aperiodic-ZP-CSI-RS-ResourceSetsToAddModList"). In action 304, the BS may transmit, to the UE, a second PDSCH configuration in a BWP configuration for unicast PDSCH. The second PDSCH configuration may include a resource configuration (e.g., "zp-CSI-RS-ResourceToAddModList") and a second aperiodic resource set configuration. The resource configuration may configure one or more ZP CSI-RS resources. In action 306, the BS may transmit, to the UE, first DCI scheduling a multicast PDSCH. The first DCI may include a first field for triggering aperiodic ZP CSI-RS. The first field may enable the UE to determine a first ZP CSI-RS resource set from a first list of ZP CSI-RS resource sets configured by the first aperiodic resource set configuration. The first ZP CSI-RS resource set is not available for reception of the multicast PDSCH. The resource configuration may be absent in the first PDSCH configuration. Each of the first list of ZP CSI-RS resource sets may include at least one of the one or more ZP CSI-RS resources.

FIG. 4 is a flowchart illustrating a method 400 performed by a BS for handling PDSCH transmission according to an example implementation of the present disclosure. In action 402, the BS may transmit, to a UE, a first PDSCH configuration in a CFR configuration for multicast PDSCH (e.g., "CFR-ConfigMulticast(-r17)"). The first PDSCH configuration may include a first aperiodic resource set configuration (e.g., "aperiodic-ZP-CSI-RS-ResourceSetsToAddModList"). In action 404, the BS may transmit, to the UE, a second PDSCH configuration in a BWP configuration for unicast PDSCH. The second PDSCH configuration may include a resource configuration (e.g., "zp-CSI-RS-ResourceToAddModList") and a second aperiodic resource set configuration. The resource configuration may configure one or more ZP CSI-RS resources. In action 406, the BS may transmit, to the UE, first DCI scheduling a multicast PDSCH. The first DCI may include a first field for triggering aperiodic ZP CSI-RS. The first field may enable the UE to determine a first ZP CSI-RS resource set from a first list of ZP CSI-RS resource sets configured by the first aperiodic resource set configuration. The first ZP CSI-RS resource set is not available for reception of the multicast PDSCH. The resource configuration may be absent in the first PDSCH configuration. Each of the first list of ZP CSI-RS resource sets may include at least one of the one or more ZP CSI-RS resources. In action 408, the BS may transmit, to the UE, second DCI scheduling a unicast PDSCH. The second DCI may include a second field for triggering aperiodic ZP CSI-RS. The second field may enable the UE to determine a second ZP CSI-RS resource set from a second list of ZP CSI-RS resource sets configured by the second aperiodic resource set configuration. The second ZP CSI-RS resource set is not available for reception of the unicast PDSCH. Each of the second list of ZP CSI-RS resource sets may include at least one of the one or more ZP CSI-RS resources.

In some implementations, the second field of the second DCI may indicate a resource set ID of the second ZP CSI-RS resource set.

In some implementations, the CFR configuration may be included in the BWP configuration.

In some implementations, the first field of the first DCI may indicate a resource set ID of the first ZP CSI-RS resource set.

In some implementations, each of the one or more ZP CSI-RS resources may be associated with a resource ID. The at least one of the one or more ZP CSI-RS resources included in each of the first list of ZP CSI-RS resource sets may be indicated by a list of resource IDs configured by the first aperiodic resource set configuration. The list of resource IDs may be associated with the at least one of the one or more ZP CSI-RS resources.

It should be noted that the order in which the process is described is not intended to be construed as a limitation, and any number of the described actions may be combined in any order to implement the method or an alternate method. Moreover, one or more of the actions illustrated in FIGS. 1 through 4 may be omitted in some implementations.

Figure 5:
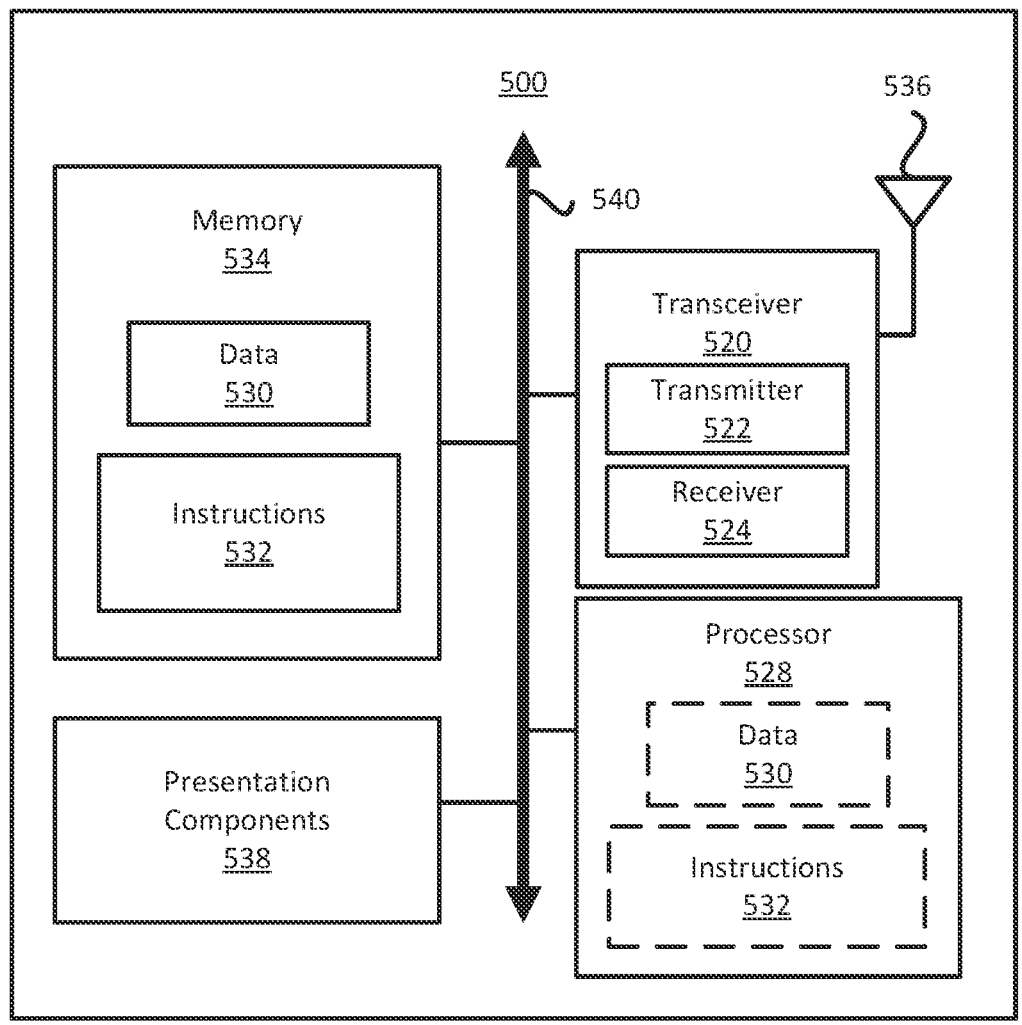
FIG. 5 is a block diagram illustrating a node for wireless communication according to an example implementation of the present disclosure.

FIG. 5 is a block diagram illustrating a node 500 for wireless communication according to an example implementation of the present disclosure. As illustrated in FIG. 5, a node 500 may include a transceiver 520, a processor 528, a memory 534, one or more presentation components 538, and at least one antenna 536. The node 500 may also include a RF spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory includes solid-state memory, hard drives, optical-disc drives, etc. As illustrated in FIG. 5, the memory 534 may store computer-readable, computer-executable instructions 532 (e.g., software codes) that are configured to cause the processor 528 to perform various disclosed functions, for example, with reference to FIGS. 1 through 4. Alternatively, the instructions 532 may not be directly executable by the processor 528 but be configured to cause the node 500 (e.g., when compiled and executed) to perform various disclosed functions.

The processor 528 (e.g., having processing circuitry) may include an intelligent hardware device, e.g., a Central Processing Unit (CPU), a microcontroller, an ASIC, etc. The processor 528 may include memory. The processor 528 may process data 530 and the instructions 532 received from the memory 534, and information transmitted and received via the transceiver 520, the base band communications module, and/or the network communications module. The processor 528 may also process information to be sent to the transceiver 520 for transmission via the antenna 536 to the network communications module for transmission to a CN.

One or more presentation components 538 present data indications to a person or another device. Examples of presentation components 538 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art will recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for handling physical downlink shared channel (PDSCH) reception, the method comprising:

receiving, from a base station (BS), a first PDSCH configuration in a common frequency resource (CFR) configuration for a multicast PDSCH, the first PDSCH configuration including a first aperiodic resource set configuration;

receiving, from the BS, a second PDSCH configuration in a bandwidth part (BWP) configuration for a unicast PDSCH, the second PDSCH configuration including a resource configuration and a second aperiodic resource set configuration, wherein:

the resource configuration is used for configuring one or more zero-power (ZP) channel state information-reference signal (CSI-RS) resources, the resource configuration is absent in the first PDSCH configuration, the first aperiodic resource set configuration is used for configuring a first list of ZP CSI-RS resource sets associated with the resource configuration, each of the first list of ZP CSI-RS resource sets includes at least one of the one or more ZP CSI-RS resources, and the second aperiodic resource set configuration is used for configuring a second list of ZP CSI-RS resource sets associated with the resource configuration;

receiving, from the BS, first downlink control information (DCI) scheduling the multicast PDSCH, the first DCI including a first field for triggering a first aperiodic ZP CSI-RS; and determining, based on the first field, a first ZP CSI-RS resource set, which is not available for reception of the multicast PDSCH, from the first list of ZP CSI-RS resource sets.

2. The method of claim 1, further comprising:
receiving, from the BS, second DCI scheduling the unicast PDSCH, the second DCI including a second field for triggering a second aperiodic ZP CSI-RS; and determining, based on the second field, a second ZP CSI-RS resource set, which is not available for reception of the unicast PDSCH, from the second list of ZP CSI-RS resource sets, wherein each of the second list of ZP CSI-RS resource sets includes at least one of the one or more ZP CSI-RS resources.

3. The method of claim 2, wherein the second field of the second DCI indicates a resource set identity (ID) of the second ZP CSI-RS resource set.

4. The method of claim 1, wherein the CFR configuration is included in the BWP configuration.

5. The method of claim 1, wherein the first field of the first DCI indicates a resource set identity (ID) of the first ZP CSI-RS resource set.

6. The method of claim 1, wherein:
each of the one or more ZP CSI-RS resources is associated with a resource identity (ID), and the at least one of the one or more ZP CSI-RS resources included in each of the first list of ZP CSI-RS resource sets is indicated by a list of resource IDs configured by the first aperiodic resource set configuration, the list of resource IDs being associated with the at least one of the one or more ZP CSI-RS resources.

7. A user equipment (UE) for handling physical downlink shared channel (PDSCH) reception, the UE comprising:
one or more non-transitory computer-readable media storing one or more computer-executable instructions; and at least one processor coupled to the one or more non-transitory computer-readable media and configured to execute the one or more computer-executable instructions to cause the UE to:

receive, from a base station (BS), a first PDSCH configuration in a common frequency resource (CFR) configuration for a multicast PDSCH, the first PDSCH configuration including a first aperiodic resource set configuration;

receive, from the BS, a second PDSCH configuration in a bandwidth part (BWP) configuration for a unicast PDSCH, the second PDSCH configuration including a resource configuration and a second aperiodic resource set configuration, wherein:

the resource configuration is used for configuring one or more zero-power (ZP) channel state information-reference signal (CSI-RS) resources, the resource configuration is absent in the first PDSCH configuration, the first aperiodic resource set configuration is used for configuring a first list of ZP CSI-RS resource sets associated with the resource configuration, each of the first list of ZP CSI-RS resource sets includes at least one of the one or more ZP CSI-RS resources, and the second aperiodic resource set configuration is used for configuring a second list of ZP CSI-RS resource sets associated with the resource configuration;

receive, from the BS, first downlink control information (DCI) scheduling the multicast PDSCH, the first DCI including a first field for triggering a first aperiodic ZP CSI-RS; and determine, based on the first field, a first ZP CSI-RS resource set, which is not available for reception of the multicast PDSCH, from the first list of ZP CSI-RS resource sets.

8. The UE of claim 7, wherein the at least one processor is further configured to execute the one or more computer-executable instructions to cause the UE to:

receive, from the BS, second DCI scheduling the unicast PDSCH, the second DCI including a second field for triggering a second aperiodic ZP CSI-RS; and determine, based on the second field, a second ZP CSI-RS resource set, which is not available for reception of the unicast PDSCH, from the second list of ZP CSI-RS resource sets, wherein each of the second list of ZP CSI-RS resource sets includes at least one of the one or more ZP CSI-RS resources.

9. The UE of claim 8, wherein the second field of the second DCI indicates a resource set identity (ID) of the second ZP CSI-RS resource set.

10. The UE of claim 7, wherein the CFR configuration is included in the BWP configuration.

11. The UE of claim 7, wherein the first field of the first DCI indicates a resource set identity (ID) of the first ZP CSI-RS resource set.

12. The UE of claim 7, wherein:
each of the one or more ZP CSI-RS resources is associated with a resource identity (ID), and the at least one of the one or more ZP CSI-RS resources included in each of the first list of ZP CSI-RS resource sets is indicated by a list of resource IDs configured by the first aperiodic resource set configuration, the list of resource IDs being associated with the at least one of the one or more ZP CSI-RS resources.

13. A method performed by a base station (BS) for handling physical downlink shared channel (PDSCH) transmission, the method comprising:
- transmitting, to a user equipment (UE), a first PDSCH configuration in a common frequency resource (CFR) configuration for a multicast PDSCH, the first PDSCH configuration including a first aperiodic resource set configuration;
- transmitting, to the UE, a second PDSCH configuration in a bandwidth part (BWP) configuration for a unicast PDSCH, the second PDSCH configuration including a resource configuration and a second aperiodic resource set configuration, wherein:
  - the resource configuration is used for configuring one or more zero-power (ZP) channel state information-reference signal (CSI-RS) resources,
  - the resource configuration is absent in the first PDSCH configuration,
  - the first aperiodic resource set configuration is used for configuring a first list of ZP CSI-RS resource sets associated with the resource configuration,
  - each of the first list of ZP CSI-RS resource sets includes at least one of the one or more ZP CSI-RS resources, and
  - the second aperiodic resource set configuration is used for configuring a second list of ZP CSI-RS resource sets associated with the resource configuration; and
- transmitting, to the UE, first downlink control information (DCI) scheduling the multicast PDSCH, the first DCI including a first field for triggering a first aperiodic ZP CSI-RS, wherein:
  - the first field enables the UE to determine a first ZP CSI-RS resource set, which is not available for reception of the multicast PDSCH, from the first list of ZP CSI-RS resource sets.

14. The method of claim 13, further comprising:
- transmitting, to the UE, second DCI scheduling the unicast PDSCH, the second DCI including a second field for triggering a second aperiodic ZP CSI-RS, wherein:
  - the second field enables the UE to determine a second ZP CSI-RS resource set, which is not available for reception of the unicast PDSCH, from the second list of ZP CSI-RS resource sets, and
  - each of the second list of ZP CSI-RS resource sets includes at least one of the one or more ZP CSI-RS resources.

15. The method of claim 14, wherein the second field of the second DCI indicates a resource set identity (ID) of the second ZP CSI-RS resource set.

16. The method of claim 13, wherein the CFR configuration is included in the BWP configuration.

17. The method of claim 13, wherein the first field of the first DCI indicates a resource set identity (ID) of the first ZP CSI-RS resource set.

18. The method of claim 13, wherein:
- each of the one or more ZP CSI-RS resources is associated with a resource identity (ID), and
- the at least one of the one or more ZP CSI-RS resources included in each of the first list of ZP CSI-RS resource sets is indicated by a list of resource IDs configured by the first aperiodic resource set configuration, the list of resource IDs being associated with the at least one of the one or more ZP CSI-RS resources.

* * * * *